(12) United States Patent
Nova

(10) Patent No.: US 9,358,450 B2
(45) Date of Patent: Jun. 7, 2016

(54) INTERACTIVE EDUCATION SYSTEMS AND METHODS

(71) Applicant: Kenneth Mark Nova, Scarsdale, NY (US)

(72) Inventor: Kenneth Mark Nova, Scarsdale, NY (US)

(*) Notice: Subject to any disclaimer, the term of this patent is extended or adjusted under 35 U.S.C. 154(b) by 106 days.

(21) Appl. No.: 14/247,843

(22) Filed: Apr. 8, 2014

(65) Prior Publication Data

US 2015/0283455 A1 Oct. 8, 2015

(51) Int. Cl.
| | |
|---|---|
| A63F 13/10 | (2006.01) |
| A63F 9/24 | (2006.01) |
| A63F 9/18 | (2006.01) |
| G09B 7/00 | (2006.01) |
| A63F 13/80 | (2014.01) |

(52) U.S. Cl.
CPC .............. *A63F 9/183* (2013.01); *A63F 13/80* (2014.09); *G09B 7/00* (2013.01); *A63F 2300/8064* (2013.01)

(58) Field of Classification Search
USPC .......................................................... 463/9
See application file for complete search history.

(56) References Cited

U.S. PATENT DOCUMENTS

| | | | |
|---|---|---|---|
| 5,035,625 | A | 7/1991 | Munson et al. |
| 6,394,899 | B1 | 5/2002 | Walker |
| 6,688,889 | B2 | 2/2004 | Wallace et al. |
| 7,013,325 | B1 | 3/2006 | Vivian et al. |
| 7,402,105 | B1 | 7/2008 | Hutter et al. |
| 8,454,419 | B1* | 6/2013 | Smith ............... G09B 5/00 434/72 |
| 2003/0060284 | A1 | 3/2003 | Hamalainen et al. |
| 2006/0183099 | A1 | 8/2006 | Feely et al. |
| 2007/0231780 | A1* | 10/2007 | Shulman ............ G09B 7/08 434/350 |
| 2007/0269788 | A1 | 11/2007 | Flowers et al. |
| 2007/0281285 | A1 | 12/2007 | Jayaweera |
| 2008/0020364 | A1 | 1/2008 | Wattendorf et al. |
| 2008/0286740 | A1 | 11/2008 | Wi et al. |

OTHER PUBLICATIONS www.sat-preparation.co.ll, PrepMe, Sep. 22, 2010 (2 pages).
https://web.archive.org/web/20121224020259/http://play2prep.com/, Prep Games, Dec. 24, 2012 (1 page).
http://www.play2prep.com/, play2prep, Apr. 10, 2014 (2 pages).

* cited by examiner

*Primary Examiner* — Pierre E Elisca
(74) *Attorney, Agent, or Firm* — Finnegan, Henderson, Farabow, Garrett & Dunner, LLP

(57) ABSTRACT

An interactive education system includes a database storing a common question database and a plurality of user-specific question inventories, a memory storing computer instructions, and a processor configured to execute the computer instructions to perform operations including presenting a game environment between a first user and a second user where the first and second users can throw questions from their respective question inventories or common question database at each other with or without offensive power-ups, and answer the questions thrown by each other with or without defensive power-ups; rewarding the first and second users with credits and points when the first and second users answer the questions correctly; determining which one of the first and second users wins the game based on the respective total number of points achieved by the first and second users; and enabling the first and second users to purchase additional offensive or defensive power-ups with their respective credits.

20 Claims, 18 Drawing Sheets

| | | | XP: 8976 CREDITS: 1006 LEVEL ③ | |
|---|---|---|---|---|
| PRACTICE ROOM | ACHIEVEMENTS | LEADERBOARDS | STORE | HELP |

○ ACT  ○ SAT

0:00  answered 5/5  accuracy 80%

✓ ✓ × ✓ ✓
Free Daily Questions

> PLAY A GAME

FREE DAILY QUESTIONS RESULTS

| | QUESTIONS | | XP | CREDITS |
|---|---|---|---|---|
| 1 | Parallelism | ✓ | 10 | 10 |
| 2 | Averages | ✓ | 10 | 10 |
| 3 | Main Idea | × | 10 | 0 |
| 4 | Scientific Method | ✓ | 10 | 10 |
| 5 | Circles | ✓ | 10 | 10 |
| | TOTAL CORRECT: 4 | | 50 | 40 |

> PRACTICE MORE

INVITE FRIENDS
- Send invitation to Firstname Lastname
- Send invitation to Firstname Lastname
- Send invitation to Firstname Lastname PRACTICE
- Free Daily Questions  5 of 5 answered
- Lines & Angles  4 of 7 answered YOUR TURN
- Firstname Lastname  Started Mar. 16, 12:45pm  Last played 30 min ago
- Firstname Lastname  Started Mar. 16, 12:45pm  Last played 30 min ago THEIR TURN
- Firstname Lastname  Last played 4 days ago  > SEND REMINDER 500
510
520
530
540

FIG. 5

ACT PRACTICE ROOM

Free Daily ACT Questions — 0 / 10 answered —%

ACT Questions Variety Pack — 12 / 30 answered — 56%

| ENGLISH | MATHEMATICS | READING | SCIENCE REASONING |
|---|---|---|---|

| | access | answered | accuracy |
|---|---|---|---|
| English | | 15 / 30 | 62% |
| Active vs. passive voice | ☐ | 0 / 12 | —% |
| Adjectives vs. adverbs — 342 | ☐ | 0 / 5 | —% |

[ GET ACCESS ] — 710
90 CREDITS

7 NEW QUESTIONS
• INSTRUCTION, STRATEGIES & TIPS
0 OF 5 QUESTIONS PREVIOUSLY ANSWERED

— 700

| | | |
|---|---|---|
| Author's purpose | 0 / 10 | 0% |
| Comparisons | 2 / 10 | 20% |
| Modifiers | 5 / 12 | 30% |
| Organization | 4 / 5 | —% |
| Parallelism | 8 / 10 | 35% |
| Possessives | 4 / 7 | 45% |

| | PRACTICE ROOM | ACHIEVEMENTS | LEADERBOARDS | STORE | FAQ |

XP: 8976   CREDITS: 1006   LEVEL ③

● ACT  ○ SAT

> PLAY A GAME

INVITE FRIENDS

- Send invitation to Firstname Lastname >
- Send invitation to Firstname Lastname >
- Send invitation to Firstname Lastname >

PRACTICE
- Free Daily Questions 5 of 5 answered PACK COMPLETED >
- Lines & Angles 4 of 7 answered >

YOUR TURN
- Firstname Lastname Started Mar. 16, 12:45pm Last played 30 min ago >
- Firstname Lastname Started Mar. 16, 12:45pm Last played 30 min ago >

THEIR TURN
- Firstname Lastname Last played 4 days ago → SEND REMINDER >

0:00  Firstname 45 ✓|✗|✓|✓  56 ✓|✓|✓|✓
      Firstname    ✓|✓|✓|✗     ✗|✗|✓|✗
Sample text goes here and here too

FIRSTNAME WINS!

970

| | QUESTIONS | XP | CREDITS |
|---|---|---|---|
| 1 | Critical Reading / Passage Base | ✗ | 0 | 0 |
| 2 | Science | ✓ | 2 | 2 |
| 3 | Editing in Context | ✓ | 2 | 2 |
| 4 | Identification of Sentence Errors | ✓ | 2 | 2 |
| 5 | Math / Arithmetic | ✓ | 2 | 2 |
| 6 | Critical Reading Longer Category N... | ✗ | 0 | 0 |
| 7 | Math / Arithmetic | ✗ | 0 | 0 |
| 8 | Sentence Correction | | | |

TOTAL CORRECT: 5            10        10

> REMATCH 980    990

CHAT

ACT LEADERBOARDS

XP: 8976  CREDITS: 1006  LEVEL ③

| PRACTICE ROOM | ACHIEVEMENTS | LEADERBOARDS | STORE | FAQ |

● ALL PLAYERS   ○ FRIENDS   ○ STATE   ○ HIGH SCHOOL

| | LAST 7 DAYS | LAST 30 DAYS | | ALL TIME | |
|---|---|---|---|---|---|
| RANK | PLAYER | | XP | LEVEL | GAMES WON |
| 1 | Firstname Lastname | | 56489 | 80 | 14565 |
| 2 | Firstname Lastname | | 56472 | 79 | 14559 |
| 3 | Firstname Lastname | | 56421 | 78 | 14542 |
| 4 | Firstname Lastname | | 56398 | 77 | 14536 |
| 5 | Firstname Lastname | | 56382 | 76 | 14531 |
| 6 | Firstname Lastname | | 56373 | 75 | 14522 |
| 7 | Firstname Lastname | | 56365 | 74 | 14510 |
| 8 | Firstname Lastname | | 56360 | 73 | 14506 |
| 9 | Firstname Lastname | | 56349 | 72 | 14489 |
| 10 | Firstname Lastname | | 56328 | 71 | 14476 |

● ACT   ○ SAT

> PLAY A GAME

INVITE FRIENDS

- Send invitation to Firstname Lastname
- Send invitation to Firstname Lastname
- Send invitation to Firstname Lastname PRACTICE
- Free Daily Questions  5 of 5 answered  PACK COMPLETED
- Lines & Angles  4 of 7 answered YOUR TURN
- Firstname Lastname  Started Mar. 16, 12:45pm  Last played 30 min ago
- Firstname Lastname  Started Mar. 16, 12:45pm  Last played 30 min ago THEIR TURN
- Firstname Lastname  Last played 4 days ago  → SEND REMINDER

1100

1110, 1120, 1130

INTERACTIVE EDUCATION SYSTEMS AND METHODS

FIELD OF THE DISCLOSURE

The present disclosure is generally related to interactive education systems and methods. More specifically, the present disclosure involves interactive education systems and methods that provide interactive educational applications.

BACKGROUND OF THE DISCLOSURE

Test preparation is often viewed by test-takers as a chore and a necessary evil. Test preparation software and materials for standardized tests such as the PSAT®, SAT®, ACT®, GMAT®, MCAT®, LSAT®, GRE®, etc., are traditionally time consuming, solitary undertakings, and a test-taker's only motivation for using them is the long-term goal of improving his test score.

Additionally, these conventional systems are usually expensive because they are sold as bundled products, forcing the test-taker to purchase an entire program, whether or not the test-taker actually needs the same amount of help in all of the sections or skills being tested. For example, the SAT is generally broken into three sections—math, reading, and writing. Each section includes multiple skills. For example, math includes skills such as averages, absolute value, graphing quadratics, etc. However, a student may exhibit a mastery of one or more sections or skills and be deficient at others. Still, traditional test preparation tools require the student to purchase software or materials for all of the sections or skills being tested, wasting the student's time and money.

SUMMARY OF THE DISCLOSURE

In one aspect, the present disclosure is directed to an interactive education system including a database storing a common question database and a plurality of user-specific question inventories, a memory storing computer instructions, and a processor configured to execute the computer instructions to perform operations. The operations may include presenting a game environment between a first user and a second user where the first and second users can throw questions from the common question database or their respective question inventories at each other with offensive power-ups, and answer the questions thrown by each other with defensive power-ups; rewarding the first and second users with credits and points when the first and second users answer the questions correctly; determining which one of the first and second users wins the game based on the respective total number of points achieved by the first and second users; and enabling the first and second users to purchase additional offensive or defensive power-ups with their respective credits.

In another aspect, the present disclosure is directed to a computer-implemented method for providing an interactive educational application to a plurality of users. The method may include presenting a game environment between a first user and a second user where the first and second users can throw questions from the common question database or their respective question inventories at each other, and answer the questions thrown by each other; respectively rewarding the first and second users with credits and points when the first and second users answer the questions correctly; determining which one of the first and second users wins the game based on the respective total number of points achieved by the first and second users; and enabling the first and second users to purchase offensive or defensive power-ups by using their respective credits.

In yet another aspect, the present disclosure is directed to a non-transitory computer-readable medium including computer-readable code to cause a computer means to execute a method. The method may include presenting a game environment between a first user and a second user where the first and second users can throw questions from the common question database or their respective question inventories at each other, and answer the questions thrown by each other; respectively rewarding the first and second users with credits and points when the first and second users answer the questions correctly; determining which one of the first and second users wins the game based on the respective total number of points achieved by the first and second users; and enabling the first and second users to purchase offensive or defensive power-ups by using their respective credits.

BRIEF DESCRIPTION OF THE DRAWINGS

FIG. 5 is a screen shot of an exemplary practice results section consistent with embodiments of the present disclosure.

FIG. 7A is a screen shot of an exemplary skill-based question access interface consistent with embodiments of the present disclosure.

FIG. 9A is a screen shot of an exemplary answer question interface consistent with embodiments of the present disclosure.

FIG. 9B is a screen shot of an exemplary game results interface consistent with embodiments of the present disclosure.

FIG. 11 is a screen shot of an exemplary leaderboards interface consistent with embodiments of the present disclosure.

DETAILED DESCRIPTION

Figure 1:
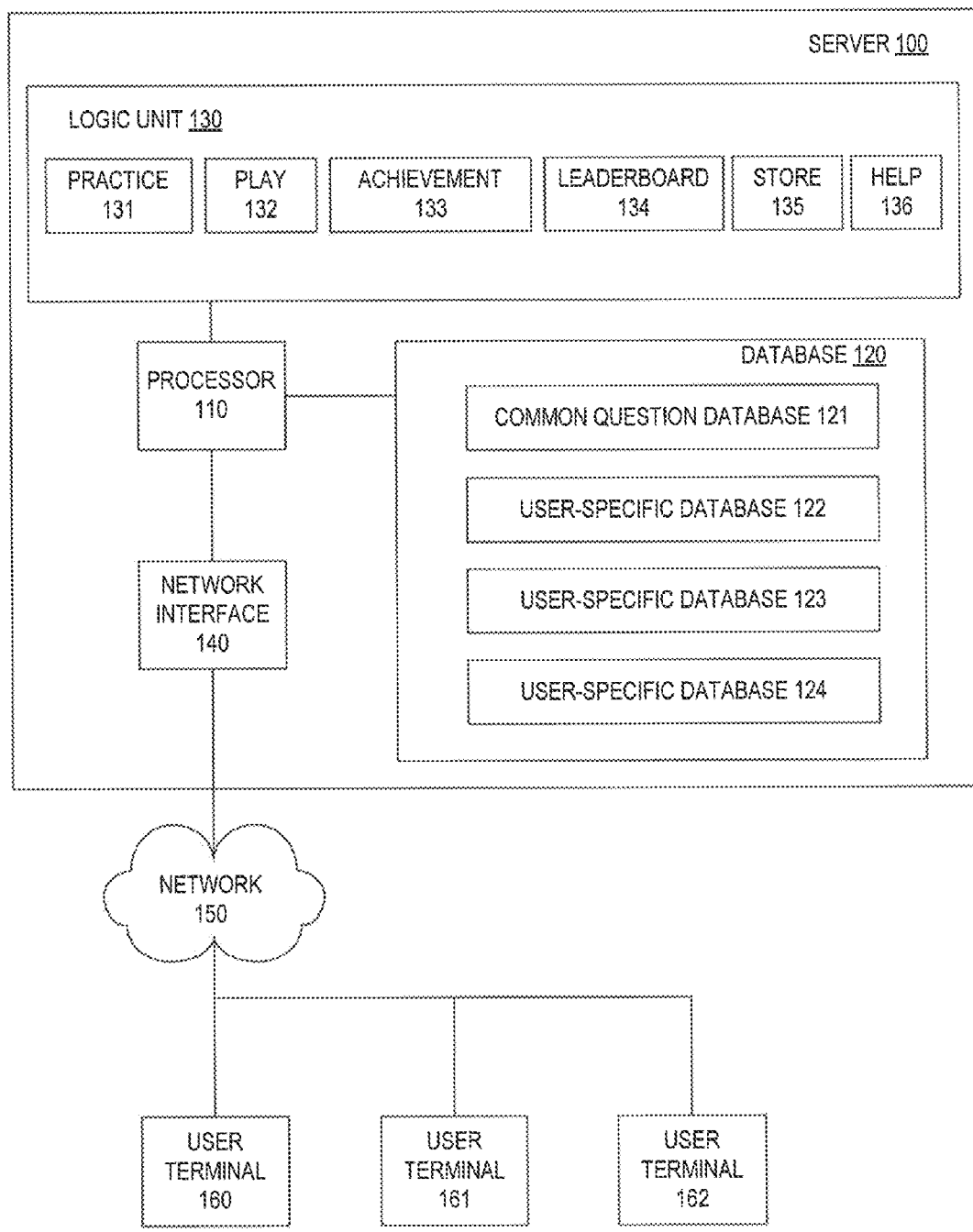
FIG. 1 is a block diagram of an exemplary interactive education system consistent with embodiments of the present disclosure.

Reference will now be made in detail to various embodiments, examples of which are illustrated in the accompanying drawings. Wherever possible, the same reference numbers will be used throughout the drawings to refer to the same or like parts.

Systems and methods consistent with the present disclosure provide interactive educational applications that may be implemented via social media, such as Facebook®, through an online web site, and with mobile phones. The interactive educational applications enable users to practice test questions individually, in a practice component, and enable users to play games directly with other users, in a play component, in order to prepare for a standardized test.

The practice component, or single-user mode, for example, may enable a user to answer practice questions each day, with or without the aid of power-ups. Power-ups provide greater functionality to answer a question and will be discussed in further exemplary detail below. If the user answers the practice questions correctly, the user may acquire credits. Based on the user's answers, the application may identify question sections or skills in a question section where the user requires additional study. The user may purchase learning modules comprising instruction and additional practice questions for the identified skills. In this way, the application may provide test preparation materials in an "unbundled" fashion, allowing the user to purchase materials only in subject areas where he/she needs to improve.

The play component, or multi-user mode, for example, may enable the user to play a game against an opponent, or multiple opponents, or against the application itself. During the game, each user (i.e., player of the game) can "throw" a question using power-ups at another player or players to answer. The players may then have to answer each other's questions using power-ups. The players achieve a score based on correct/incorrect answers and the impact of power-ups used. Whoever has the highest score at the end of a predetermined number of rounds may be declared the winner.

The application may enable the user to earn credits by answering questions correctly in the practice component and the play component, or to pay for game credits with virtual or real-world currency. The credits can be used to purchase additional questions (in the practice component), power-ups for use in the practice and play components, and/or learning modules. The application also can be accessed by users for free with earned credits.

The application may also include an achievement component and a leaderboard component that track the progress and performance of users practicing and playing a game. The software may include customizable leaderboards. For example, users may be grouped by the high school they attend or by a college they are interested in attending, and these groups may be tracked by dedicated leaderboards so that users may track their progress against classmates or future classmates. Numerous other types of groupings are possible as well. In certain embodiments, the software may facilitate communication between the schools and users using this data. Users may also communicate with other users. Such communication may, for example, take place via instant messaging, e-mail, chat, etc.

In other embodiments, the application can be customized for any test or subject matter that has a corresponding curriculum of skills and question sets for each skill. For example, a professional licensing exam or a college course could be taught and tested using the game platform. The platform could be offered to educational institutions, such as universities or test preparation companies or licensing organizations that assess users and award licenses. Further customization is possible with any test or curriculum-based subject matter.

FIG. 1 is a block diagram of an exemplary interactive education system ("system") 10 consistent with embodiments of the present disclosure. As illustrated in FIG. 1, system 10 may include a server 100, which includes a processor 110, a database 120, a logic unit 130, and a network interface 140. Server 100 may be connected via network 150 to user terminals 160-162.

Server 100 may be a computer or a workstation, or the like, configured to provide an interactive educational application. In some embodiments, server 100 may include any combination of dedicated or shared servers and some of the servers may be arranged in one or more server farms. In some embodiments, the interactive educational application may run on a pre-existing social-networking platform (SNP) such as Facebook®, for example. In these embodiments, server 100 may be a SNP server with databases storing SNP user profile information. The interactive educational application may pull SNP user profile information from the SNP databases via the SNP application-programming interface (API) in order to obtain profile information for facilitating communication between users during the practice and play components. Various other social networks and SNPs may be used additionally or alternatively.

Processor 110 may include one or more processing devices, such as one or more microprocessors from the Pentium™ or Xeon™ family manufactured by Intel™, the Turion™ family manufactured by AMD™, or any other type of processors. As shown in FIG. 1, processor 110 is communicatively coupled to database 120, logic unit 130, and network interface 140. Processor 110 may be configured to execute computer program instructions to perform various processes and methods consistent with certain disclosed embodiments.

Database 120 may be implemented as a volatile or non-volatile, magnetic, semiconductor, tape, optical, removable, nonremovable, or other type of storage device or computer-readable medium that can store, organize, sort, filter, and/or arrange data used by server 100 and/or processor 110. The data may be stored in one or more tables, lists, or other data structures.

In some embodiments, database 120 may store data that is used by server 100. In some embodiments, database 120 may store a common question database 121 including questions in different test modes (e.g., ACT®, SAT®, etc.), and question-specific data accessible by all users of system 10. The question-specific data may include, for each question, at least one of multiple choice answers, correct answer, hint, explanation, level of difficulty, the number of experience points (XPs) to be achieved by the user if answered, the number of credits to be achieved by the user if answered correctly, the section and skill that the question is directed to. Common question database 121 may also include instructional content related to the sections and/or skills. The questions may include at least one of multiple-choice questions, fill in the blank questions, true or false questions, short answer questions, and matching question.

In some embodiments, database 120 also stores, for each test mode, a plurality of user-specific databases 122-124 respectively corresponding to users of user terminals 160-162. Each or all of user-specific databases 122-124 may include a user-specific question inventory, user-specific profile information, and user-specific performance and achievement data. The user-specific profile information may include, for example, a screen name, real name, email address, birth date, location, family relationships, school, etc. In some embodiments, the interactive educational application may be used to prepare high school students for the SAT or ACT. Thus, the user-specific profile information may also include the user's high school and colleges that the user may have expressed interest in, for example. The user-specific performance and achievement data may include at least one of a total number of questions that the user has answered, a total number of experience points achieved based on the number of questions that the user has answered, a total number of credits achieved based on the accuracy of the user's answers to the questions presented to the user, a total number of power-ups earned or purchased using the credits, a total number of games won by the user, a total number of games played by the user, game-specific performance data regarding games-in-progress, the learning modules purchased using credits, and an accuracy rate with respect to a question section or skill. The user-specific performance data may also include the question-specific performance data, including time spent to answer each question, power-ups used for each question, experience points and credits achieved for each question, and other data compiled when answering each individual question.

Logic unit 130 may include one or more storage devices configured to store computer instructions to be executed by processor 110 to perform various procedures, operations, or processes consistent with the disclosed embodiments. As illustrated in FIG. 1, logic unit 130 may include a practice component 131, a play component 132, an achievement component 133, a leaderboard component 134, a store component 135, and a help component 136.

Practice component 131 may provide a practice environment to a user where the user can answer questions from the user's own question inventory or selected questions in common question database 121. Specifically, practice component 131 may enable (i.e., store instructions that enable) processor 110 to select a practice question from a user's question inventory and present the selected practice question to the user via an interface that also allows the user to answer the practice question. In various embodiments, the user may answer questions with or without one or more defensive power-ups, such as hints, increased time, narrowed answer choices, and swapped questions. The power-ups will be discussed in further exemplary detail below. Practice component 131 may also enable processor 110 to, after receiving an answer from the user, adjust the user's performance and achievement data such as, for example, the number of experience points, the number of credits, and the accuracy rate. Practice component 131 may further enable processor 110 to periodically present one or more practice questions (e.g., free daily questions) selected from common question database 121, and after receiving the user's answers to the one or more selected practice questions, add the one or more selected practice questions into the user's question inventory regardless of whether or not the user's answers are correct or not. Practice component 131 may also enable processor 110 to provide an interface on a user terminal 160-162 that displays statistics and analysis of the user's performance with respect to one or more question sections and one or more skills within the question sections. In various embodiments, practice component may allow the user to purchase additional questions and instructional materials directed to a specific question section or a specific skill within a question section.

Play component 132 may provide a game environment between two users where the users can throw questions at each other with or without offensive power-ups, and answer the questions thrown by each other with or without defensive power-ups. Specifically, play component 132 may enable a user to start a game with an opponent. The opponent may be a friend from a plurality of friends connected with the user via a social media site. The opponent may be a user from the plurality of registered users of the interactive educational application. The opponent may be a contact from the user's device contact list, including email list. Alternatively, the opponent may be randomly selected or intelligently matched with the user by processor 110, from the plurality of registered users of the interactive educational application. In other embodiments, the opponent may be a level bot (e.g., a virtual opponent) enabled by processor 110 having the same level as the user. The game may be a live game that is played in real-time while both the user and the opponent are online and logged into the interactive educational application. Alternatively, the game may be a turn-based game that is played asynchronously, i.e., the user and the opponent do not have to be logged into the interactive educational application simultaneously.

The game can be started by the user throwing a question to the opponent. For example, play component 132 may enable processor 110 to select a question from the common question database or the user's question inventory and provide an interface on user terminal 160 associated with the user that presents the question and allows the user to confirm and send (i.e., "throw") the question to the opponent. Alternatively, processor 110 may present a select question interface (not shown) which enables the user to select a question to be thrown to the opponent. In various embodiments, the question can be thrown with or without one or more offensive power-ups, such as, for example, double points, decrease time, and swap questions. The power-ups will be discussed in further exemplary detail below. After the user throws the question to the opponent, play component 132 may enable processor 110 to provide another interface on user terminal 161 that presents the question to the opponent and allows the opponent to answer the question with or without one or more defensive power-ups. After the opponent answers the question, play component 132 may enable the opponent to select a question and throw to the user. In some embodiments, after the user throws the question to the opponent, processor 110 may present another question on the interface of user terminal 160 to the user. The question presented may be an opponent's question that has been previously thrown by the opponent. Alternatively, in a first round of the game, the question presented on the interface of user terminal 160 may be randomly selected by processor 110 from common question database 121. Play component 132 may also enable processor 110 to adjust the user's performance and achievement data based on, for example, the answer received from the user, and add the opponent's question into the user's question inventory. Play component 132 also enables processor 110 to (e.g., after a predetermined number of rounds of the game), determine whether the user wins the game based on a comparison between the user's performance during the game and the opponent's performance during the game. For example, the user may achieve a predetermined number of points if the user answers a question correctly, and the opponent may achieve a predetermined number of points if the user answers a question incorrectly. For another example, the user or the opponent may achieve a predetermined number of points if the user or the opponent answers a question correctly, and may lose a predetermined number of points if the user or the opponent answers a question incorrectly. The defensive and offensive power-ups used by the user or the opponent may also affect the number of points achieved by the user or the opponent. At the end of the game, whoever has the highest number of points (e.g., score) wins the game.

Achievement component 133 may enable processor 110 to track the level information for the user based on the user's performance and achievement data. Achievement component 133 may also enable processor 110 to determine the user's current level based on the total number of experience points achieved, the total number of games played, and the total number of games won by the user. Various other types of information may be used by achievement component 133 as well to adjust the user's performance and achievement data.

Leaderboard component 134 may enable processor 110 to provide an interface that allows the user to review and organize the performance and achievement data of some or all users. Store component 135 may enable processor 110 to provide an interface that allows the user to purchase credits by using virtual or real-world currency, and to purchase virtual items using credits. Help component 136 may enable processor 110 to provide tutorial information to the user regarding the subject matter being studied or the application itself.

Network interface 140 may include one or more components configured to transmit and receive data via network 150. For example, network interface 140 may include one or more modulators, demodulators, multiplexers, de-multiplexers, network communication devices, wireless devices, antennas, modems, or any other type of device configured to enable data communication via any suitable communication network. Network interface 140 may also be configured to provide remote connectivity between processor 110, database 120, and logic unit 130, to collect, analyze, and distribute data or information associated with system 10.

Network 150 may be any appropriate network or combination of networks allowing communication between or among one or more computing systems, such as, for example, the Internet, a local area network, a wide area network, a WiFi network, a workstation peer-to-peer network, a direct link network, or any other suitable communication network. Connections with network 150 may be wired, wireless, or any combination thereof.

User terminals 160-162 may include any device capable of communicating with server 100. For example, user terminals 160-162 may include laptop, desktop, or tablet computers, cellular telephones, smart phones, personal digital assistants (PDAs), iPod®, iPad™, smart watches, etc. Each one of user terminals 160-162 may communicate with server 100 to display an interactive education interface on a display device of user terminal 160-162. The interactive education interface may be displayed using an interactive educational software program stored on user terminals 160-162, server 100, or a combination thereof. In some embodiments, user terminal 160-162 displays the interactive education interface via a web browser running on user terminal 160. In other embodiments, server 100 may store the interactive educational software program and instruct (i.e., send instructions to) user terminal 160-162 to display or update the interactive education interface based on user interactions with user terminal 160-162. Although system 10 illustrated in FIG. 1 includes three user terminals 160-162, those skilled in the art will appreciate that system 10 may include any number of user terminals.

Figure 2:
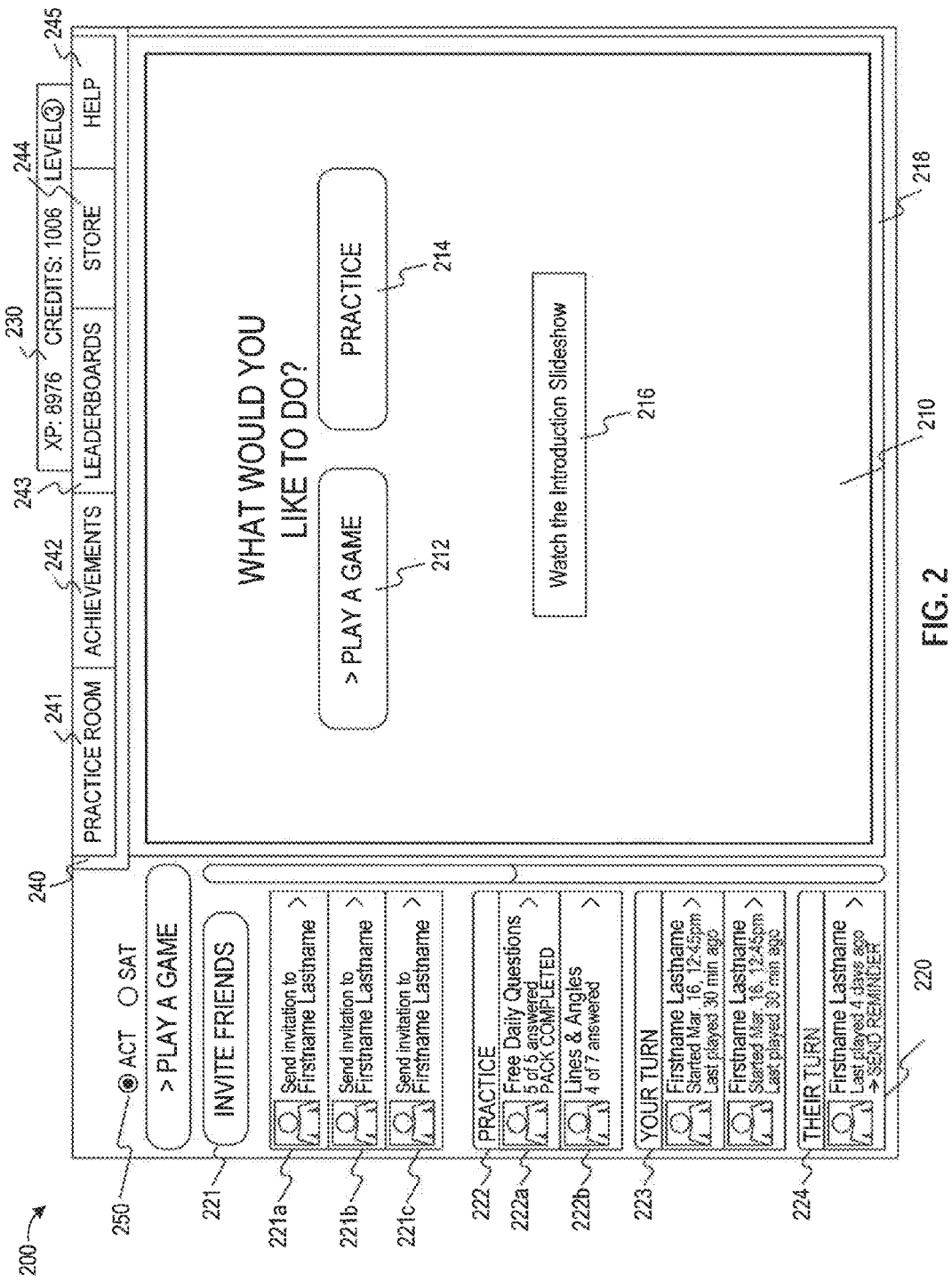
FIG. 2 is a screen shot of an exemplary home page of an interactive education interface consistent with embodiments of the present disclosure.

FIG. 2 is a screen shot of an exemplary home page 200 of an interactive education interface consistent with various embodiments. Home page 200 may be displayed on a computer screen of user terminal 160-162 when a user of user terminal 160-162 first accesses (e.g., logs into) the application. As illustrated in FIG. 2, home page 200 may include a main section 210, a game tab tile 220, a user profile tab 230, a header 240, and a test selection menu 250.

Main section 210 may include a play a game button 212 which can allow the user to select a play mode, a practice button 214 which can allow the user to select a practice mode, and an introduction button 216 which can allow the user to review a slide show including tutorial information for first-time users.

Game tab tile 220 may allow a user to access the play mode, and to review status of and play one or more pending games. Details of game tab the 220 will be discussed in further exemplary detail below. User profile tab 230 may display user information such as experience points (XP), credits, and levels. Header 240 includes a practice room tab 241, an achievements tab 242, a leaderboards tab 243, a store tab 244, and a help tab 245.

Test selection menu 250 allows the user to select a test mode (e.g., ACT or SAT) to practice by using the interactive educational application. When the user selects a specific test mode, any or all of practice component 131, play component 132, achievement component 133, leaderboard component 134, store component 135, and help component 136 will enable processor 110 to execute based on the questions in the selected test mode.

In some embodiments, main section 210 includes a borderline 218 having a specific color designated to a specific test mode. For example, borderline 218 can be red when the user selects to practice and play in ACT test mode, or can be blue when the user selects to practice and play in SAT test mode. Various other types of color schemes and graphical indicia are possible within main section 210 (e.g., icons, backgrounds, etc.).

When the user of user terminal 160 clicks practice button 214 to enter into a practice mode, processor 110 instructs user terminal 160 to display a practice room interface on the computer screen of user terminal 160.

Figure 3:
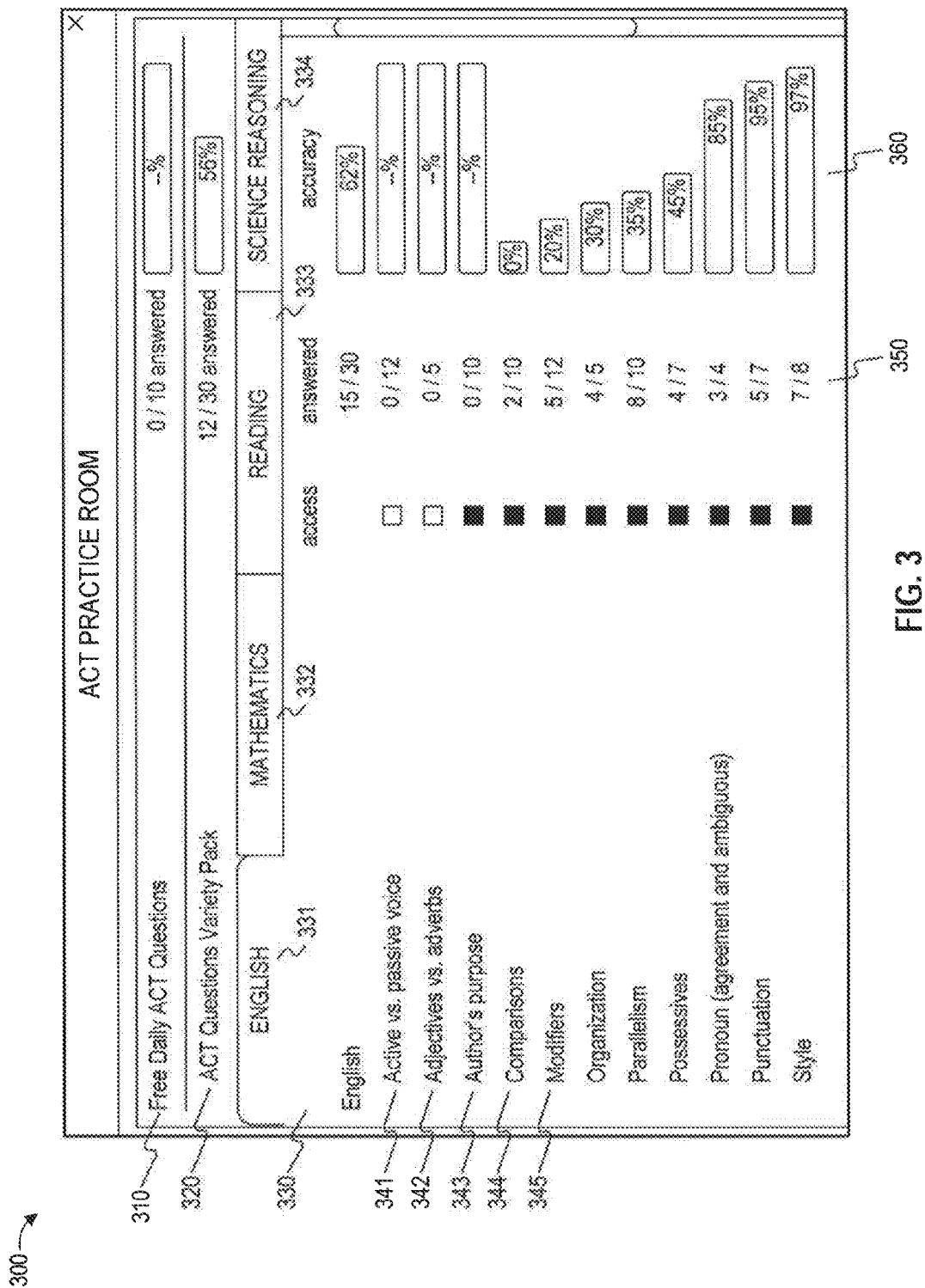
FIG. 3 is a screen shot of an exemplary practice room interface consistent with embodiments of the present disclosure.

FIG. 3 is a screen shot of an exemplary practice room interface 300 consistent with various embodiments. As illustrated in FIG. 3, practice room interface 300 may include a free daily question bar 310, a variety pack bar 320, and a skill-based review interface 330. When the user clicks free daily question bar 310, for example, processor 110 may generate a free daily question packet that includes a predetermined or variable number of free daily questions selected from common question database 121 stored in database 120, and provide the questions to the user for practice via a practice interface.

Figure 4:
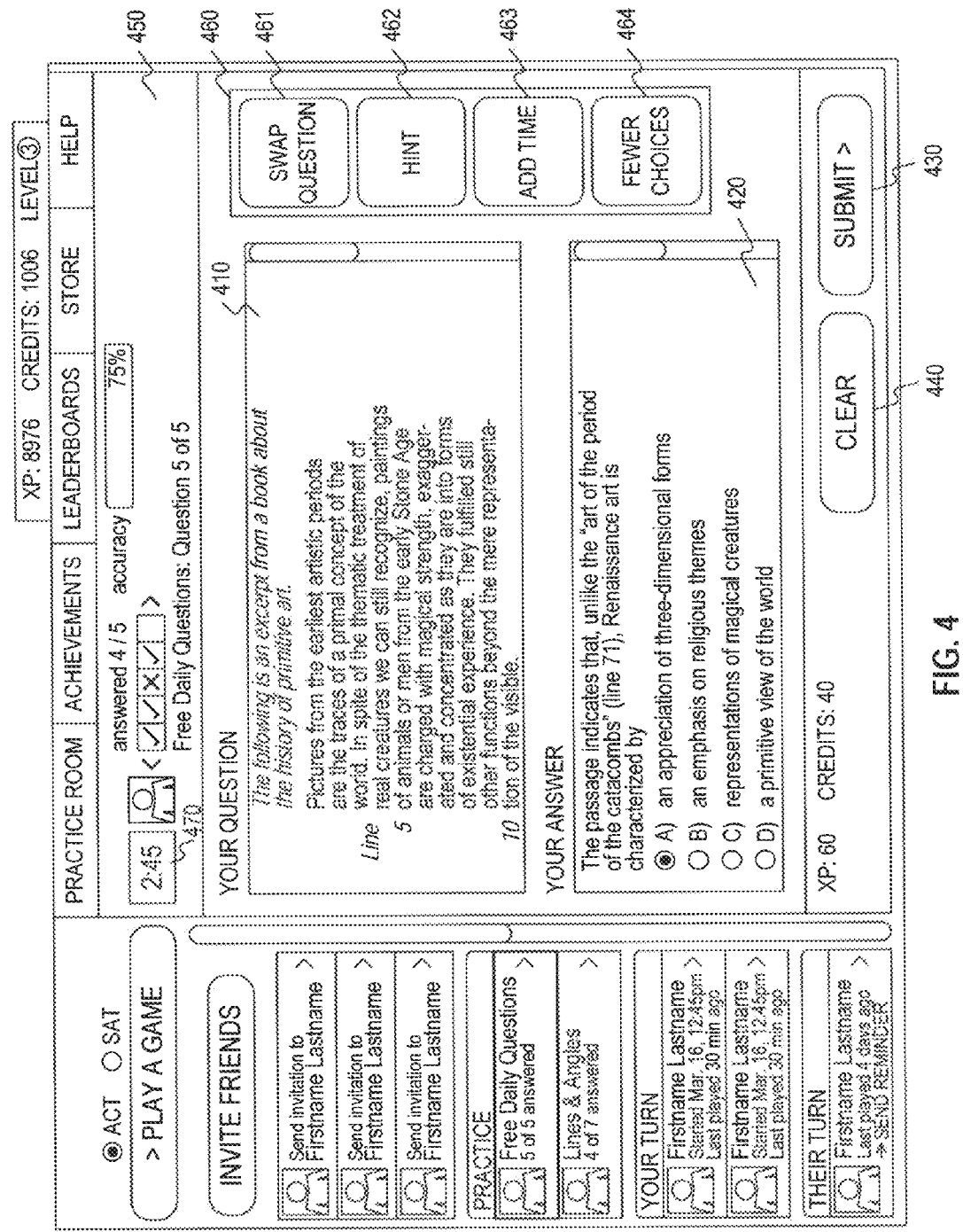
FIG. 4 is a screen shot of an exemplary practice interface consistent with embodiments of the present disclosure.

FIG. 4 is a screen shot of an exemplary practice interface 400 consistent with various embodiments. As illustrated in FIG. 4, practice interface 400 may, for example, include a question section 410 that displays each one of the free daily questions, an answer section 420 that displays multiple choice answers and allows the user to select one or more of the displayed answers, a submit button 430 that allows the user to submit the answers, and a clear button 440 that allows the user to clear the selected answer. While a multiple-choice question is displayed as an example, any type of question (e.g., fill in the blank, short answer, matching, true or false, etc.) may be used. Practice interface 400 also may include a performance bar 450 that displays the user performance in answering these free daily questions, such as, the remaining time in answering the question, the number of questions answered, questions answered correctly or incorrectly, and the accuracy rate. After the user answers the question and clicks submit button 430, processor 110 may present an answer result interface (not shown) showing whether the user answers the question correctly or incorrectly. The answer result interface may provide an explanation regarding a correct solution to the question. When the user attempts to answer a free daily question, whether answered correctly or incorrectly, the user may acquire the free daily question, and processor 110 may add the free daily question into the user's question inventory, which may be stored in user-specific database 122 associated with the user.

Practice interface 400 may also include a power-up bar 460 that allows the user to select one or more of defensive power-ups to assist the user in answering a question. For example, power-up bar 460 may include a swap question power-up 461 which, when selected (e.g., clicked), enables processor 110 to provide a different question to the user. Power-up bar 460 may also include a hint power-up 462 which, when selected, enables processor 110 to update practice interface 400 to display a hint of the question to the user. Power-up bar 460 further includes an add time power-up 463, which, when selected, enables processor 110 to increase the time allowed for the user to answer the question. Moreover, power-up bar 460 includes a fewer choices power-up 464 which, when selected, enables processor 110 to decrease the number of answer choices displayed in answer section 420. The power-ups can be acquired by the user through achievements, or can be purchased by using credits. In some embodiments, when the user selects one of power-ups 461-464, processor 110 reduces a total number of available power-ups for the user by one. Although power-up bar 460 illustrated in FIG. 4 includes four power-ups, those skilled in the art will appreciate that other types of power-ups may be included to aid in learning and increase the social and entertainment value of answering the question.

Practice interface 400 may further include a question timer 470. Processor 110 may start question timer 470 when it begins to present a question on practice interface 400 to the user. If the user does not submit an answer by clicking the submit button 430 within the time period set by question timer 470, processor 110 may automatically submit the question that is currently shown on practice interface 400 as incorrect.

After the user answers all of the free daily questions, practice component 131 may enable processor 110 to instruct user terminal 160 to display a practice results section that displays statistics regarding the user's performance in answering the questions contained in the free daily question packet.

FIG. 5 is a screen shot of an exemplary practice results section 500 consistent with various embodiments. As illustrated in FIG. 5, practice results section 500 displays a list 510 of questions that were provided (e.g., in the current day) and their respective skill such as, for example, parallelism, averages, main idea, scientific method, and circles. Practice results section 500 may also include a list 520 of experience points (XPs) that were achieved by answering the corresponding questions, and a list 530 of credits that were achieved by correctly answering the corresponding questions. Practice results section 500 may also display a total number of questions that were answered correctly, a total number of experience points, and a total number of credits achieved by the user through answering the free daily questions. Practice results section 500 may further include a practice more button 540 which, when selected, enables processor 110 to present practice room interface 300 on user terminal 160.

In addition to the free daily questions, practice component 131 may enable the user to practice with a variety of questions, i.e., variety pack questions, by clicking Variety Pack bar 320 illustrated in FIG. 3. When the user starts the application for the first time, the user's question inventory may have zero or a number of variety pack questions. The user may purchase a variety question pack containing a predetermined number of variety pack questions by using a predetermined number of credits. The purchased variety pack questions may be added into the user's question inventory, and may be accessed by the user in the future. In order to do so, processor 110 may, for example, instruct user terminal 160 to display a variety pack interface.

Figure 6:
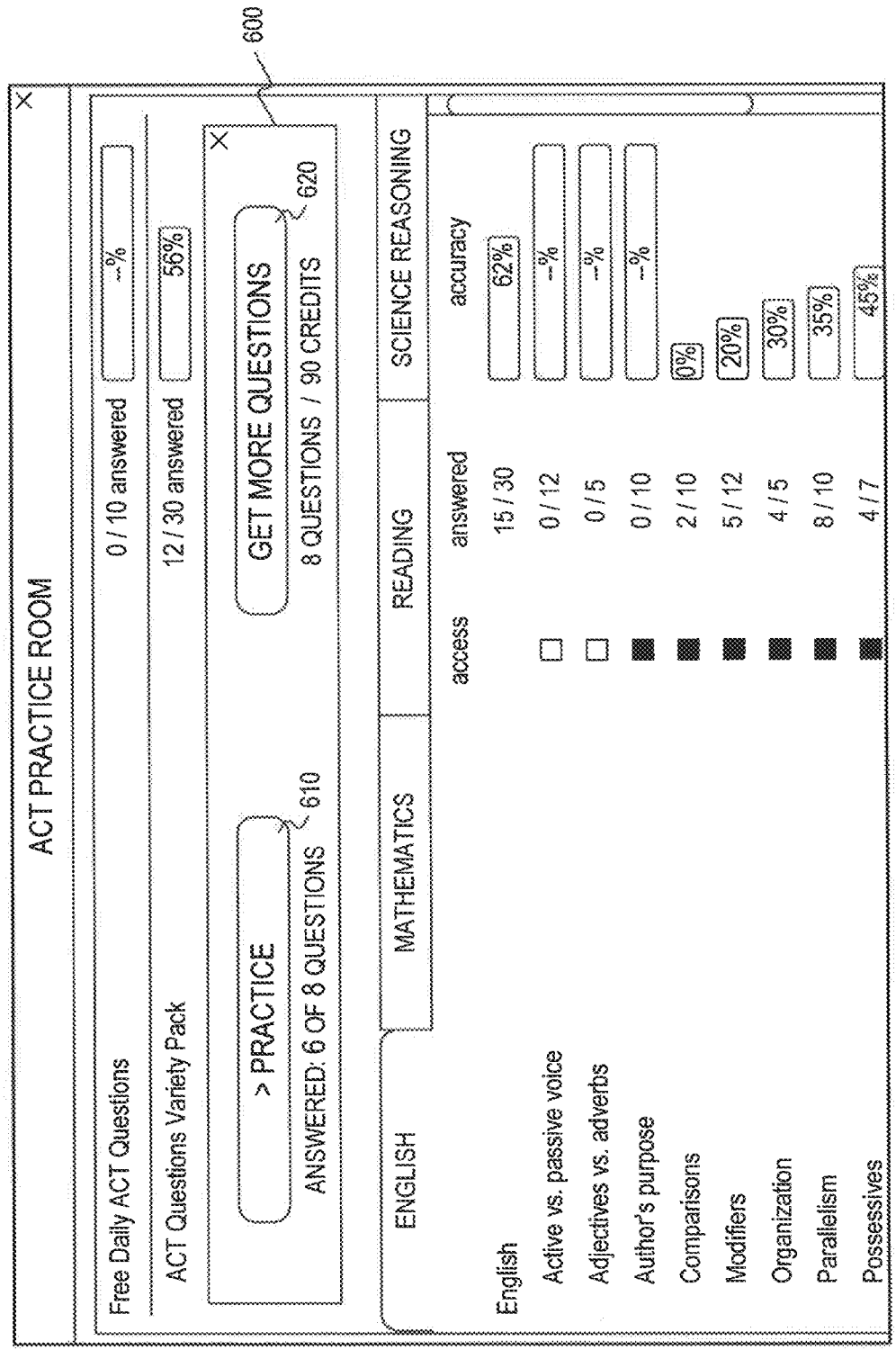
FIG. 6 is a screen shot of an exemplary variety pack interface consistent with embodiments of the present disclosure.

FIG. 6 is a screen shot of an exemplary variety pack interface 600 consistent with various embodiments. As illustrated in FIG. 6, variety pack interface 600 may include a practice button 610 and a get more questions button 620. When the user clicks practice button 610, processor 110 may instruct the user terminal 160 to display a practice interface similar to practice interface 400 illustrated in FIG. 4 to enable the user to practice with the variety pack questions that are stored in the user's question inventory for the user to practice. When the user clicks get more questions button 620, processor 110 may generate a variety question pack that contains a predetermined number of questions selected from common question database 121 and provides the variety question pack to the user via the practice interface. Processor 110 also may reduce a total number of available credits for the user by a predetermined number when the user clicks get more questions button 620.

The questions in the user's question inventory include the questions provided to the user at signup (when a user first logs into the application), the free daily questions, the variety pack questions, and the questions acquired by playing games. These questions may be classified into several question sections, and each question section may contain questions directed to different skills. Referring back to FIG. 3, skill-based review interface 330 includes tabs of different question sections such as, for example, an English section 331, a mathematics section 332, a reading section 333, and a science reasoning section 334. Various other types of tabs for other question sections are possible as well. Each question section is further divided into a plurality of skills such as, in the example of English section 331, an active vs. passive voice skill 341, an adjectives vs. adverbs skill 342, an author's purpose skill 343, a comparisons skill 344, a modifiers skill 345, etc. For each question section and each skill within the question section, processor 110 may instruct user terminal 160 to display an answered column 350 and an accuracy column 360. Answered column 350 may include a list of numbers each representing the total number of questions in the user's question inventory that are directed to the corresponding question section or skill. Answered column 350 also may include a list of numbers each representing the number of questions in the user's question inventory that are directed to the corresponding question section or skill that the user has answered. Accuracy column 360 may include a list of percentage numbers each representing the accuracy rate of the user for the corresponding question section or skill. For example, there may be a total of 12 questions in the user's question inventory that are directed to modifiers skill 345, and the user may have previously answered 5 of the 12 questions in the user's question inventory. In addition, one of the 5 answered questions may have been answered correctly, and 4 of the questions may have been answered incorrectly. Therefore, the accuracy rate of the user regarding modifiers skill 345 may be 20%. For another example, there may be a total of 5 questions in the user's question inventory that are directed to adjectives vs. adverbs skill 342, and the user may not have answered any of these questions. Then, the accuracy rate may be null, or grayed out.

Skill-based review interface 330 also may allow the user to practice with questions that are stored in the user's question inventory and belong to a specific question section, or to purchase a learning module comprising instructional content and questions in the user's question inventory that are directed to a specific skill, or to purchase additional questions directed to the specific skill. In order to do so, the user may click one of the question sections 331-334 or skills 341-345, and in response, processor 110 may instruct user terminal 160 to display a skill-based question access interface.

FIG. 7A is a screen shot of an exemplary skill-based question access interface 700 consistent with various embodiments. Skill-based question access interface 700 can be displayed when the user wishes to purchase a learning module directed to, for example. Adjectives vs. adverbs skill 342 for the first time, by clicking Adjectives vs. adverbs skill 342 (e.g., as shown in FIG. 3). As illustrated in FIG. 7A, skill-based question access interface 700 includes a get access button 710, and displays contents of the learning module that would be provided to the user if the user clicks get access button 710. For example, the learning module may contain 7 new questions selected from common question database 121 that are directed to skill 342, instructions, strategies, and tips specific to skill 342, and 5 questions that are already in the user's question inventory and are directed to skill 342. Processor 110 also may deduct a certain number of credits from a total number of available credits for the user.

Figure 7B:
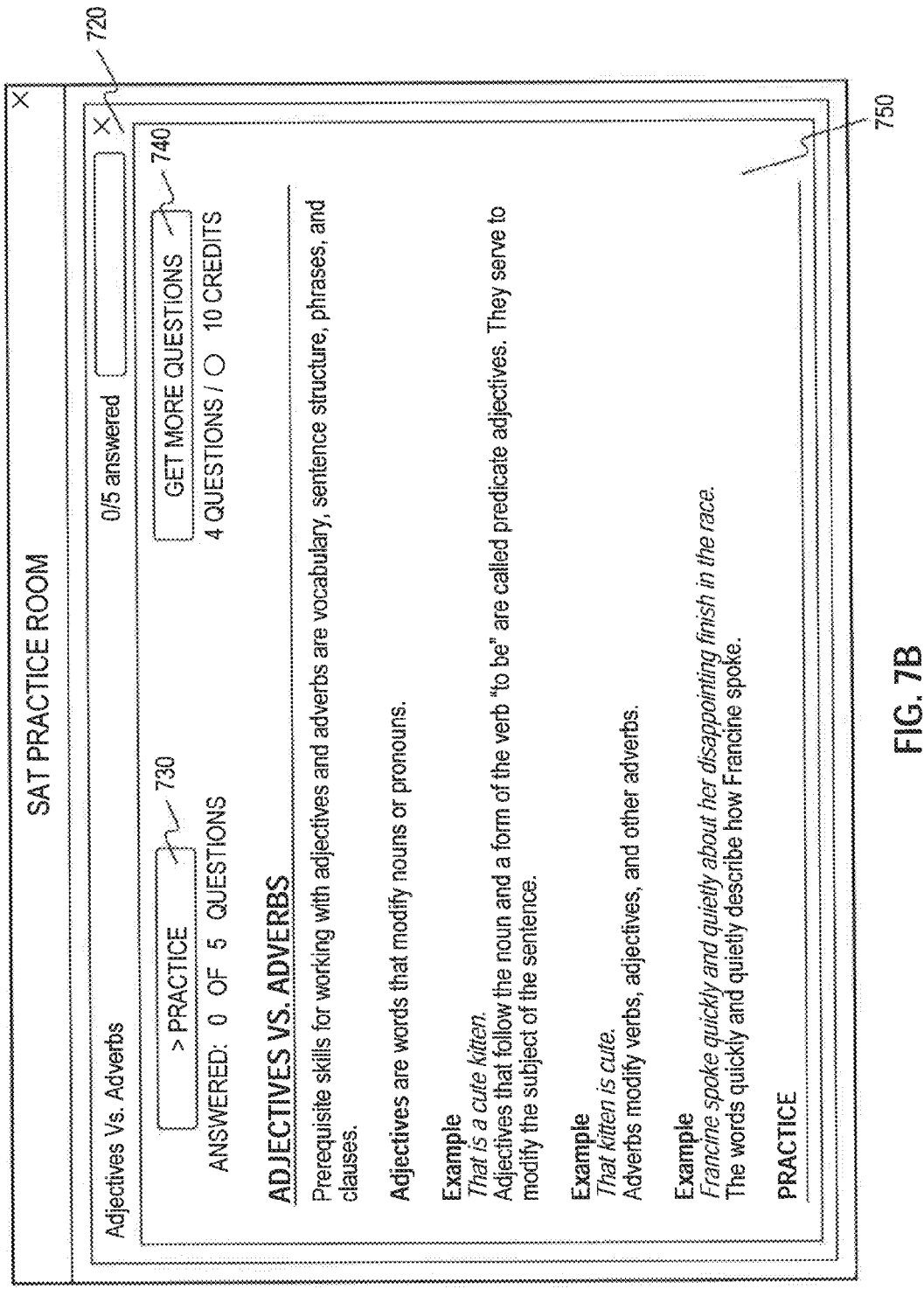
FIG. 7B is a screen shot of another exemplary skill-based question access interface consistent with embodiments of the present disclosure.

FIG. 7B is a screen shot of another exemplary skill-based question access interface 720 consistent with various embodiments. Skill-based question access interface 720 can be displayed when the user has already purchased the learning module directed to Adjectives vs. adverbs skill 342, i.e., after the user clicks get access button 710. As illustrated in 7B, skill-based question access interface 720 includes a practice button 730, a get more questions button 740, and an instruction section 750. When the user clicks practice button 730, processor 110 may present a practice interface to provide the questions that are stored in the user's question inventory and are directed to the selected skill 342. When the user clicks get more questions button 740, processor 110 may select a predetermined number, e.g., 4, of skill-based questions from common question database 121 that are directed to the selected skill 342 and provides the skill-based questions to the user via the practice interface. Processor 110 also may reduce a total number of available credits for the user by a predetermined number when the user clicks get more questions button 740.

Figure 7C:
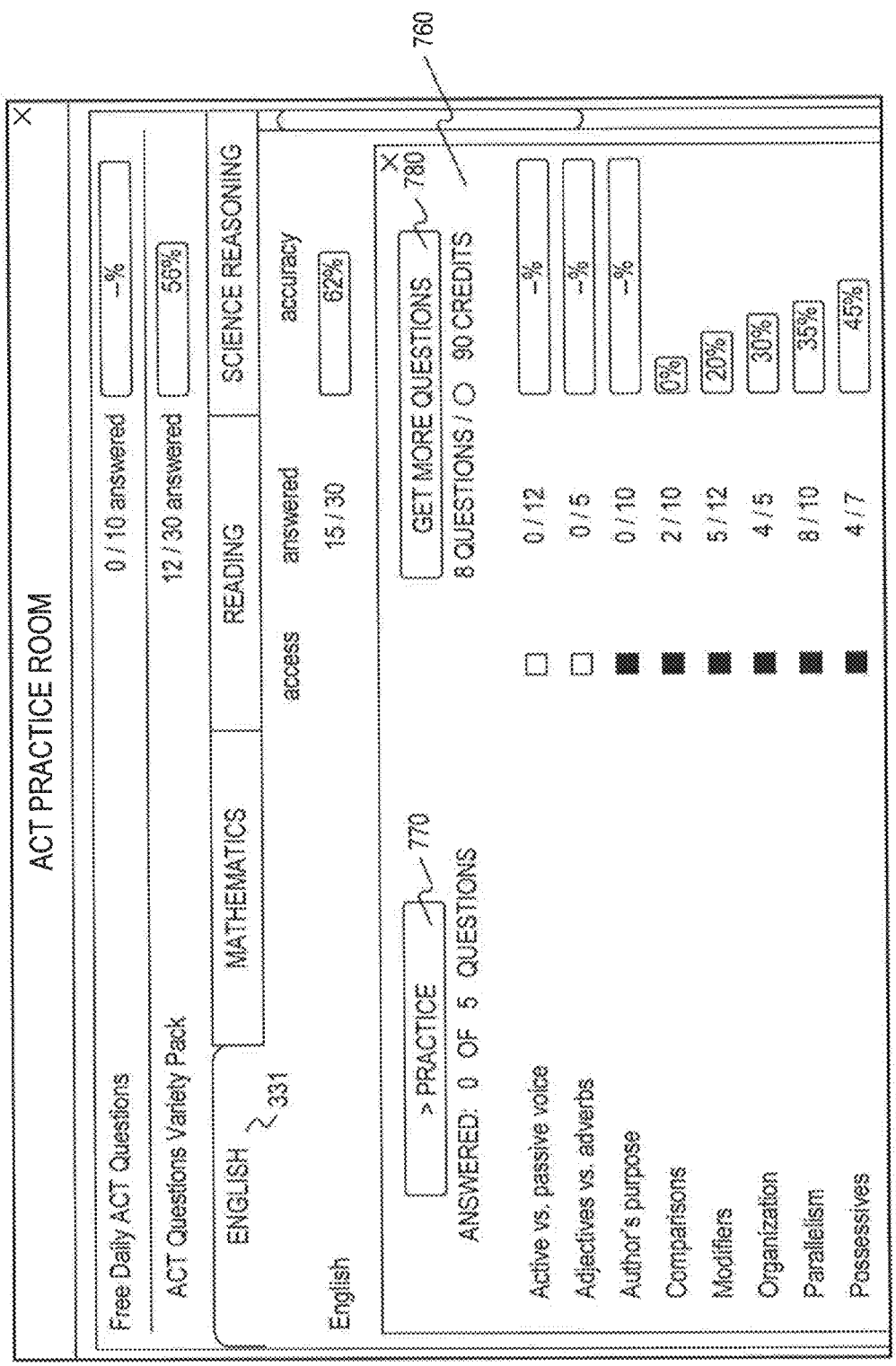
FIG. 7C is a screen shot of still another exemplary skill-based question access interface consistent with embodiments of the present disclosure.

FIG. 7C is a screen shot of a further exemplary skill-based question access interface 760 consistent with various embodiments. Skill-based question access interface 760 can be displayed when the user wishes to practice with the questions stored in the user's question inventory and belong to a specific question section, e.g., English section 331. As illustrated in 7C, skill-based question access interface 760 includes a practice button 770, and a get more questions button 780. When the user clicks practice button 770, processor 110 may present a practice interface to provide the questions that are stored in the user's question inventory and belong to English section 331. Unlike skill-based question access interface 720, the user does not have to pay credits to get access to the questions that are stored in the user's question inventory and belong to English section 331. However, no instructional content will be provided when the user clicks practice button 770. When the user clicks get more questions button 780, processor 110 may select a predetermined number, e.g., 8, of questions from common question database 121 that are directed to English section 331 and provides the questions to the user via the practice interface. Processor 110 also may reduce a total number of available credits for the user by a predetermined number when the user clicks get more questions button 780.

By unbundling the content and providing learning modules and practice questions for a single question section or skill, the present embodiments enable a user to purchase just what he needs at a lower price than if he pays for bundled test preparation materials. In this way, content is distributed more efficiently, presenting the user with a personalized, cost-effective test preparation program.

Referring back to FIG. 2, play a game button 212 and game tab tile 220 may allow the user to access play component 132 to play a game with an opponent in one-on-one mode. The opponent may be selected by the user from a plurality of friends connected with the user via a social media site. The opponent may be selected by the user from the plurality of registered users. The opponent may be selected by the user from the user's device contact list, including email list. Alternatively, the opponent may be randomly selected or intelligently matched with the user by processor 110, from the plurality of registered users. Still alternatively, the opponent may be a level bot created by processor 110. The level bot will be explained in further exemplary detail.

Specifically, game tab tile 220 may include an invite friends button 221 that, when clicked by the user, may present a send request window (not shown) which enables the user to invite one or more friends connected with the user via a social media site to access the application. Game tab tile 220 may also include a list of friends 221a-221c. The user can send an invitation to one of friends 221a-221c to access the application. The user can also challenge one of friends 221a-221c to play a game (who may have already accessed the application). Game tab tile 220 may also include a practice menu 222 that includes a free daily question link 222a that allows the user to access the free daily questions, and one or more skill-specific question links 222b that allow the user to access the skill-specific questions the user has previously purchased or acquired. Game tab tile 220 may further include a your turn menu 223 that includes a list of pending games with respective opponents that are waiting for the user's response. The user can, for example, access a pending game by clicking one of the pending games in your turn menu 223. Moreover, game tab tile 220 may include a their turn menu 224 that includes a list of pending games that are waiting for opponents' response.

When the user accesses a pending game by, for example, clicking one of the pending games in your turn menu 223, processor 110 may instruct user terminal 160 to display an answer question interface to allow the user to answer a question from his/her opponent. Alternatively, in another embodiment, the throw question interface may be displayed when the user initiates a game.

Figure 8:
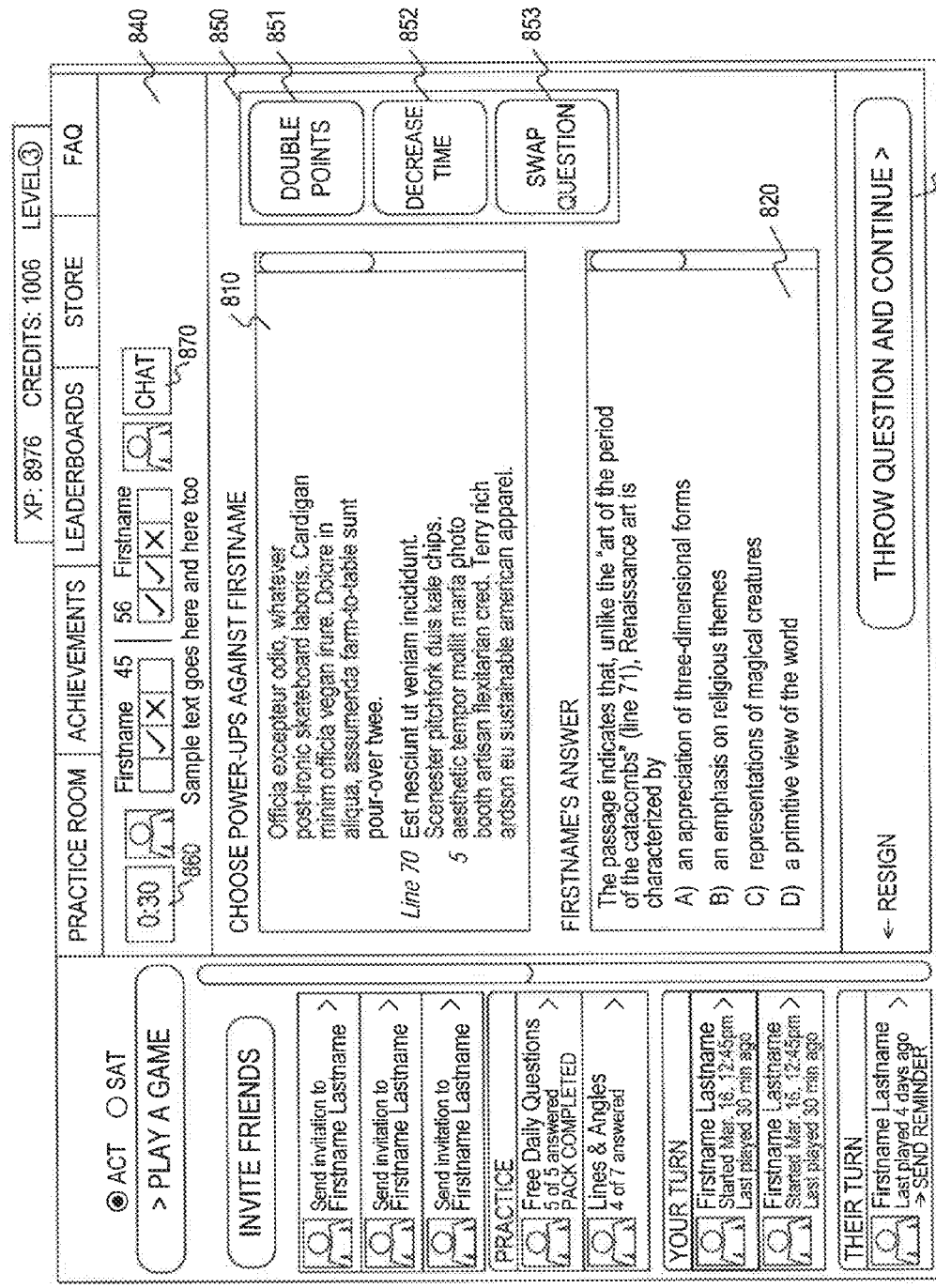
FIG. 8 is a screen shot of an exemplary throw question interface consistent with embodiments of the present disclosure.

FIG. 8 is a screen shot of an exemplary throw question interface 800 consistent with various embodiments. As illustrated in FIG. 8, throw question interface 800 may include a question section 810 that displays a question selected by processor 110 from the user's question inventory or from the common question database to be answered by the opponent, an answer section 820 that displays multiple choice answers to be selected by the opponent, and a throw question button 830 which allows the user to throw the selected question to the opponent. In some embodiments, processor 110 may be configured to select a question from the user's question inventory or common question database that has not been answered by the opponent. When the opponent answers the question correctly, the opponent may achieve a predetermined or variable number of points (i.e., score) associated with the question. Otherwise, when the opponent answers the question incorrectly, the opposing player may achieve the predetermined or variable number of points. When all of the questions in the user's question inventory or common question database have been previously answered by the opponent, processor 110 is configured to randomly select a question from the user's question inventory or common question database.

Throw question interface 800 may also include a performance bar 840 that displays performance information for both the user and the opponent in the current game. For example, the performance information may include the number of questions answered correctly and the total points achieved.

Throw question interface 800 also may include a power-up bar 850 that allows the user to select one or more of offensive power-ups before throwing the displayed question to the opponent to make it more challenging for the opponent to answer correctly and score and to increase the risk and reward for each respective user. For example, power-up bar 850 may include a double points power-up 851 which, when selected, enables processor 110 to double the points associated with the question such that, when the opponent answers the question incorrectly, the opposing player will gain double points, and when the opponent answers the question correctly, the opponent will gain double points. Power-up bar 850 also may include a decrease time power-up 852 which, when selected, enables processor 110 to reduce the time for the opponent to answer the question. Power-up bar 850 may further include a swap question power-up 853 which, when selected, enables processor 110 to select a different question from the user's question inventory or common question database to throw at the opponent. As explained previously, power-ups can be acquired by the user through achievements, can be purchased by using credits, or can be obtained through various other means. When the user selects one of power-ups 851-853, processor 110 may, for example, reduce a total number of available power-ups for the user by one. Although power-up bar 850 illustrated in FIG. 8 includes three power-ups, those skilled in the art will appreciate that other types of power-ups may be included to aid in learning and increase the social and entertainment value of answering the question.

In another embodiment, instead of including power-up bar 850, throw questions interface 800 may include a series of sub-interfaces (not shown). Each sub-interface prompts the user to select or configure one of the power-ups (double points, decrease time, swap question, etc.) associated with the question to be thrown to the user.

Throw question interface 800 may further include a throw question timer 860. Processor 110 may start throw question timer 860 when it begins to present throw question interface 800 to the user. If the user does not click throw question button 830 within the time period set by throw question timer 860, processor 110 may automatically throw the question that is currently shown on thrown question interface 800. In some embodiments, throw question interface 800 may include a chat button 870 that, when clicked by the user, may enable processor 110 to present a chat window (not shown) that allows the user to chat with the opponent.

In another embodiment, throw questions interface 800 may include a select question interface (not shown). The select question interface allows the user to select a question from the user's question inventory or from the common question database.

After the user starts the game by throwing the question to the opponent, in a first round of the game, the opponent may answer the question thrown by the user and throw a question to the user, and the user may answer the question thrown by the opponent, and throw a question to the opponent. The subsequent rounds of the game may repeat the first round, until the last round, in which the opponent may answer the question thrown by the user and throw a question to the user, and the user may answer the question thrown by the opponent without throwing further questions. After the user clicks throw question button 830 to throw a question at the opponent, processor 110 may instruct user terminal 160 to display an Answer Question interface to allow the user to answer a question.

Figure 9A:
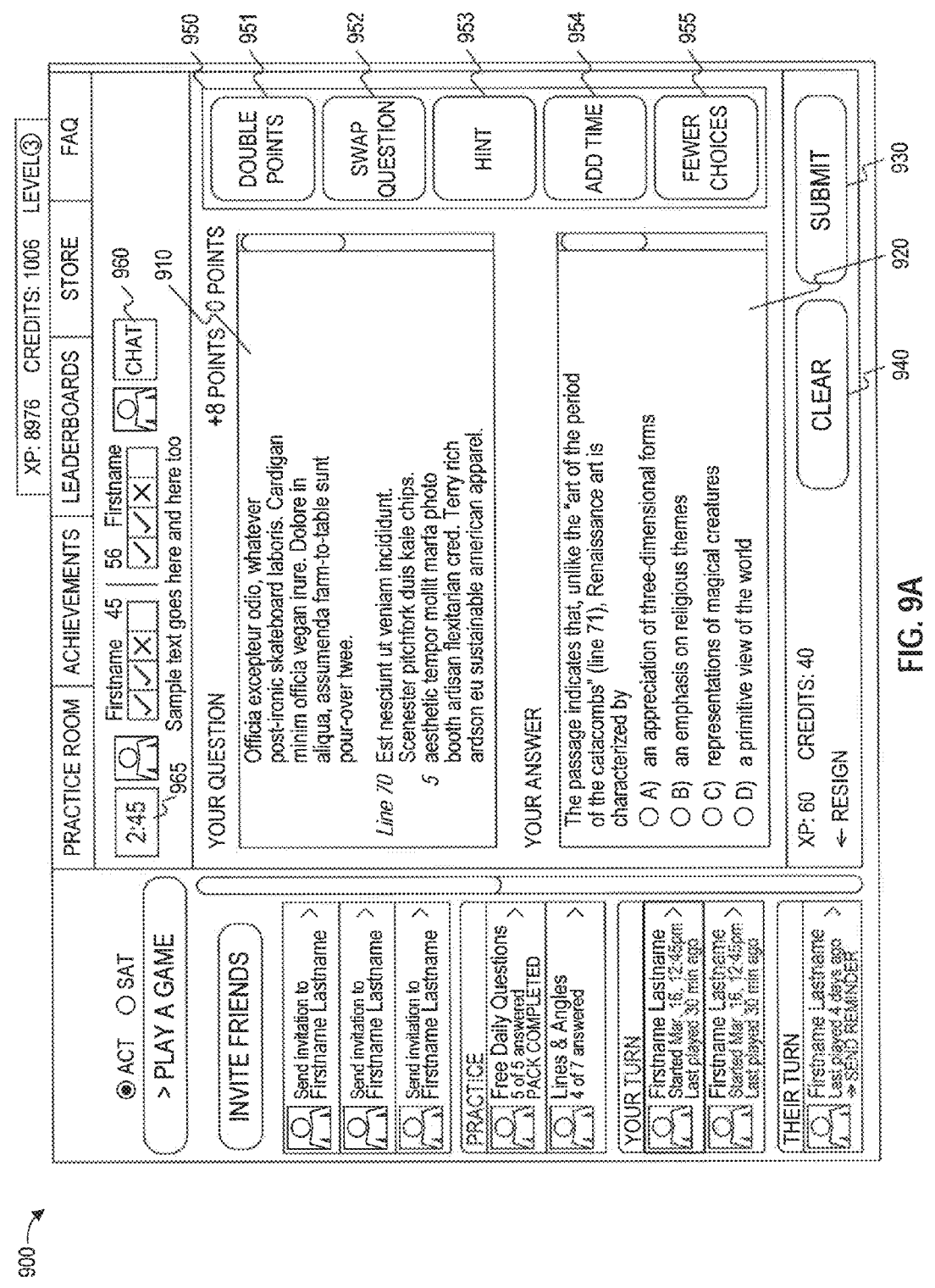

When the opponent throws a question to the user, processor 110 may present an answer question interface to the user. FIG. 9A is a screen shot of an exemplary answer question interface 900 consistent with the present disclosure. As illustrated in FIG. 9A, answer question interface 900 includes a question section 910 that displays the last question that was thrown by the opponent, an answer section 920 that displays multiple choice answers and allows the user to select one or more of the displayed answers, a submit button 930 that allows the user to submit the answers, and a clear button 940 that allows the user to clear the selected answer.

Answer question interface 900 also may include a power-up bar 950 that allows the user to select one or more of defensive power-ups to assist the user in answering the current question. For example, power-up bar 950 may include a double points power-up 951 which, when selected, enables processor 110 to double the points associated with the question such that, when the user answers the question correctly, the user will achieve double points, and when the user answers the question incorrectly, the opponent will achieve double points. Power-up bar 950 may also include a swap question power-up 952 which, when selected, enables processor 110 to select a different question from the common question database 121 and provide the selected question to the user. Power-up bar 950 also may include a hint power-up 953 which, when clicked by the user, enables processor 110 to provide a hint to the user. Power-up bar 950 further may include an add time power-up 954 which, when selected, enables processor 110 to increase the time for the user to answer the question. In some embodiments, power-up bar 950 may include a fewer choices power-up 955 which, when selected, enables processor 110 to decrease the number of answer choices displayed in answer section 920. The power-ups can be acquired by the user through achievements, or can be purchased by using credits. Various other ways of obtaining power-ups are possible as well. When the user selects one of power-ups 951-955, processor 110 may reduce a total number of available power-ups for the user by one. Again, those skilled in the art will appreciate that other types of defensive power-ups may be included in power-up bar 950 to increase risk/reward, interaction, and the social and entertainment value of the game. In addition, answer question interface 900 may include a chat button 960 that, when clicked by the user, may enable processor 110 to present a chat window (not shown) that allows the user to chat with the opponent.

Answer question interface 900 may further include an answer question timer 965. Processor 110 may start answer question timer 965 when it begins to present a question on answer question interface 900 to the user. If the user does not submit an answer by clicking submit button 930 within the time period set by answer question timer 965, processor 110 may automatically submit the question that is currently shown on answer question interface 900 as incorrect.

After the user throws the question, the user finishes his turn of the game. Then, processor 110 may wait for an input from the opponent to access the game. When the opponent accesses the game, processor 110 may present a throw question interface 800 and an answer question interface 900 similar to the ones described above. After the opponent answers the question, the opponent finishes his turn of the game. Then, one round of the game is completed. Processor 110 may repeat the above process for a predetermined number of rounds, and then determine that the game is over.

When the game is finished, processor 110 may determine the respective scores of the user and the opponent based on the total points achieved throughout the game. Processor 110 may also determine which one of the user and the opponent wins the game based on their respective scores. Processor 110 may further present a game result interface 970 as illustrated in FIG. 9B consistent with various embodiments. As illustrated in FIG. 9B, game result interface 970 may display the winner's name, and a list 980 of experience points that were achieved by the winner by answering the corresponding questions, and a list 990 of credits that were achieved by the winner by correctly answering the corresponding questions. In the event of matching scores between the user and the opponent, processor 110 may display that the game may end in a tie, and may display the result in game result interface 970.

Referring back to FIG. 2, header 240 may include achievements tab 242 that allows the user to access achievement component 133. When the user of user terminal 160 clicks achievements tab 242 to access achievement component 133, processor 110 may instruct user terminal 160 to display an achievements interface on the computer screen of user terminal 160.

Figure 10:
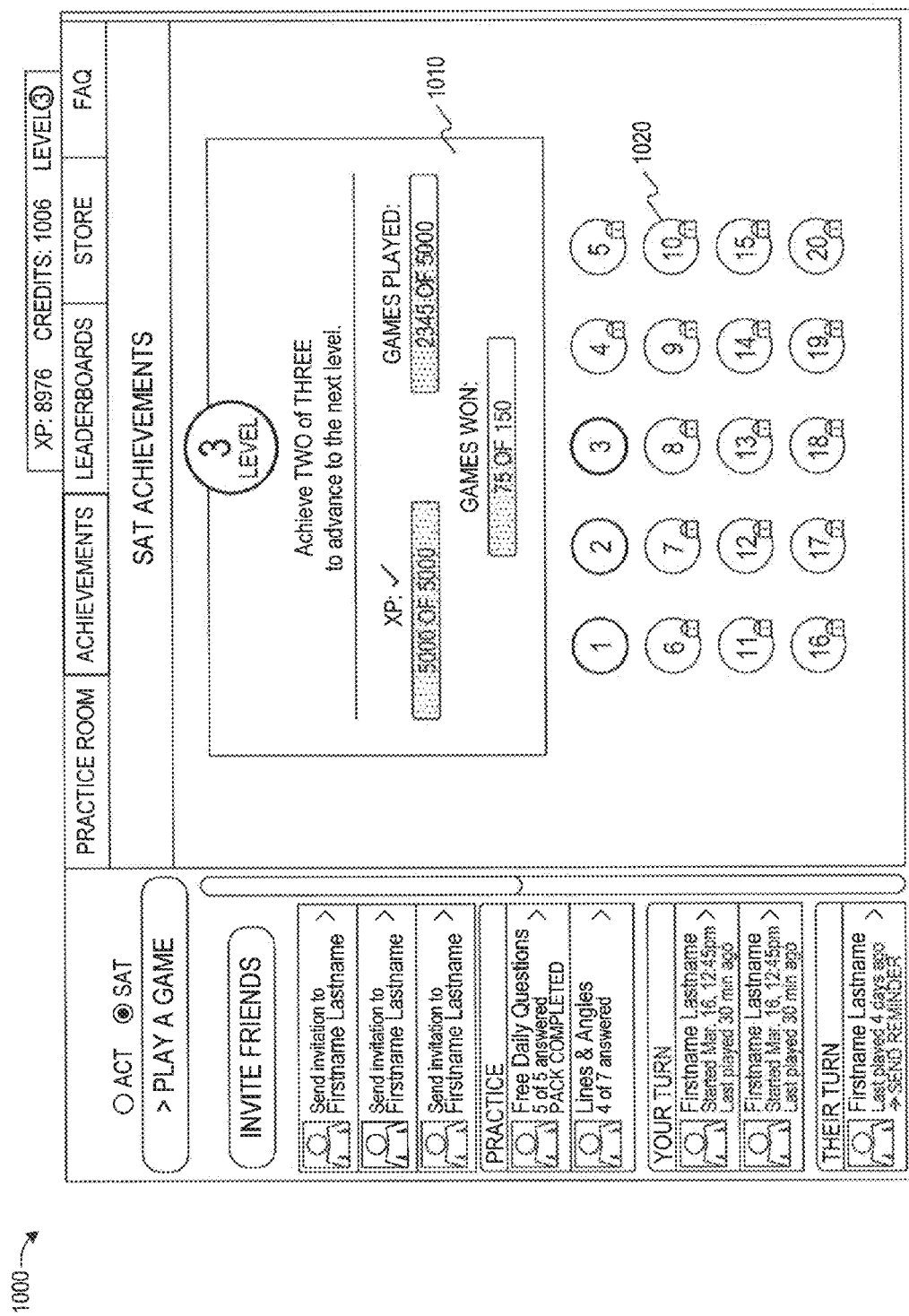
FIG. 10 is a screen shot of an exemplary achievements interface consistent with embodiments of the present disclosure.

FIG. 10 is a screen shot of an exemplary achievements interface 1000 consistent with various embodiments. As illustrated in FIG. 10, achievements interface 1000 includes a performance section 1010 which may display the user's performance information related to the selected test mode. For example, the level achievement information may include the total number of experience points achieved, the total number of games played, and the total number of games won, among other performance data. Achievements interface 1000 also may include a level section 1020 that may display the level information of the user's current level.

In some embodiments, processor 110 may determine the user's current level based on three parameters: the total number of experience points achieved, the total number of games played, and the total number of games won. Various other parameters are possible as well. In some embodiments, in order to unlock a further level, the user must achieve a predetermined number or score for at least one of the parameters. For example, the user must achieve 5,000 experience points, play 5,000 games, and win 150 of games. The first through third numbers are specific for each level. In some embodiments, when the user unlocks the next level, the previous level is locked. Then, when the user accesses play component 132 and indicates that he/she wants to play a game with a level bot provided by the system, play component 132 may enable processor 110 to act as an opponent having the same level as the user.

Referring back to FIG. 2, header 240 may include leaderboards tab 243 that, when selected, enables the user to access a leaderboard component 134. Leaderboard component 134 may enable processor 110 to rank users by experience points, level, and games won, among other factors. When the user of user terminal 160 clicks leaderboards tab 243 to access leaderboard component 134, processor 110 may instruct user terminal 160 to display a leaderboard interface on the computer screen of user terminal 160.

FIG. 11 is a screen shot of an exemplary leaderboard interface 1100 consistent with the present disclosure. As illustrated in FIG. 11, leaderboard interface 1100 includes a leaderboard 1110 that displays a list of all-time XP users (users with highest experience points) and their respective achievement information, such as experience points, levels, and games won. Various other rankings are possible as well. The leaderboard interface 1100 may, for example, allow the user to configure leaderboard 1110 to rank the users based on their achievements over a certain time period or since they began playing. Leaderboard interface 1100 also may allow the user to select a user displayed on leaderboard interface 1100 by clicking an icon associated with the user, and thereby challenge the selected user to a game.

Leaderboard interface 1100 also may include a sort players tab 1120, which allows the user to sort through and compare a subset of users. For example, the user can review the achievement information of the user's friends, classmates, or social network acquaintances. In another example, the sort players tab 1120 can rank the users in a specific state or specific school. If the interactive educational application is used to prepare students for standardized tests such as the SAT or ACT, for example, the user may be able to display customized leader boards for the user's school, for rival schools, for colleges in which the user is interested in attending, etc. By customizing the leader boards and allowing a user to compare himself/herself to peers or future classmates, the user may be more motivated to study for a test.

Leaderboard 1100 further may include a sort by time tab 1130, which allows the user to sort through the users with reference to activity within certain time periods. For example, when the user selects a tab that reads "last 7 days", processor 110 may display a list of users who achieved the highest score (e.g., experience points) in the last 7 days.

Referring back to FIG. 2, header 240 may include store tab 244 that, when selected, enables the user to access store component 135. As discussed above, a user may earn credits, for example, based on his/her performance in the practice and/or play modes. This enables the user to purchase additional test preparation material without having to pay money for it. In this way, the user can exchange his time and effort for money, earning preparation material through game play and/or practice. However, there may be times when the user needs or wants to purchase additional credits using money, rather than using credits.

Store component 135 may enable users to purchase credits by using real-world or virtual currency, or to purchase power-ups by using credits. When a user of user terminal 160 clicks store tab 244 to access store component 135, processor 110 may present a store interface to the user on user terminal 160.

Figure 12:
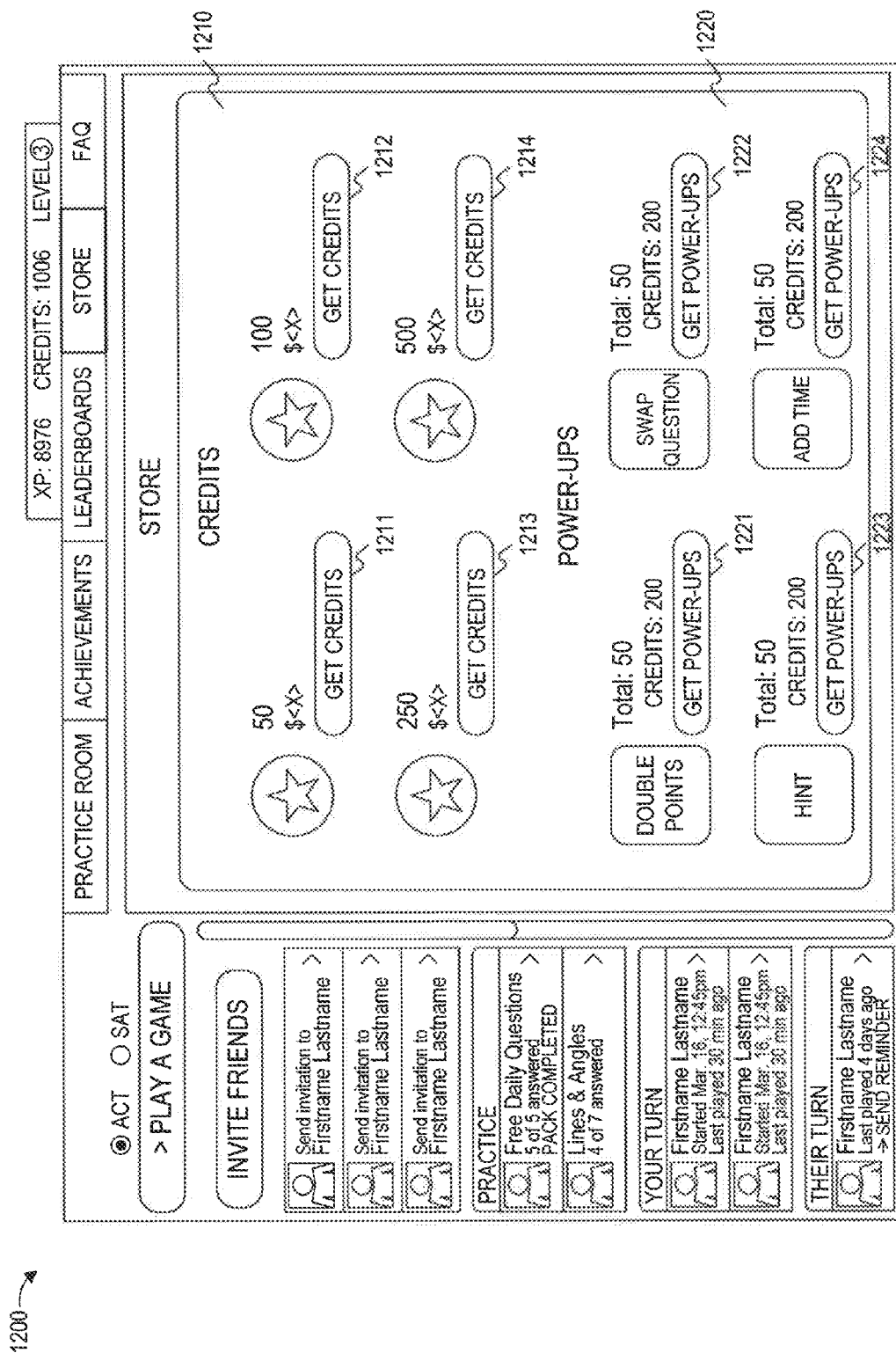
FIG. 12 is a screen shot of an exemplary store interface consistent with embodiments of the present disclosure.

FIG. 12 is a screen shot of an exemplary store interface 1200 consistent with various embodiments. As illustrated in FIG. 12, store interface 1200 may include a credit section 1210 which includes a plurality of get credits buttons 1211-1214 that, when selected, enable the user to purchase various amount of credits using various amount of real-world or virtual currency. Store interface also may include a power-up section 1220 which includes a plurality of get power-ups buttons 1221-1224 that, when selected, enable the user to purchase various amount of power-ups using various amount of credits.

Figure 13:
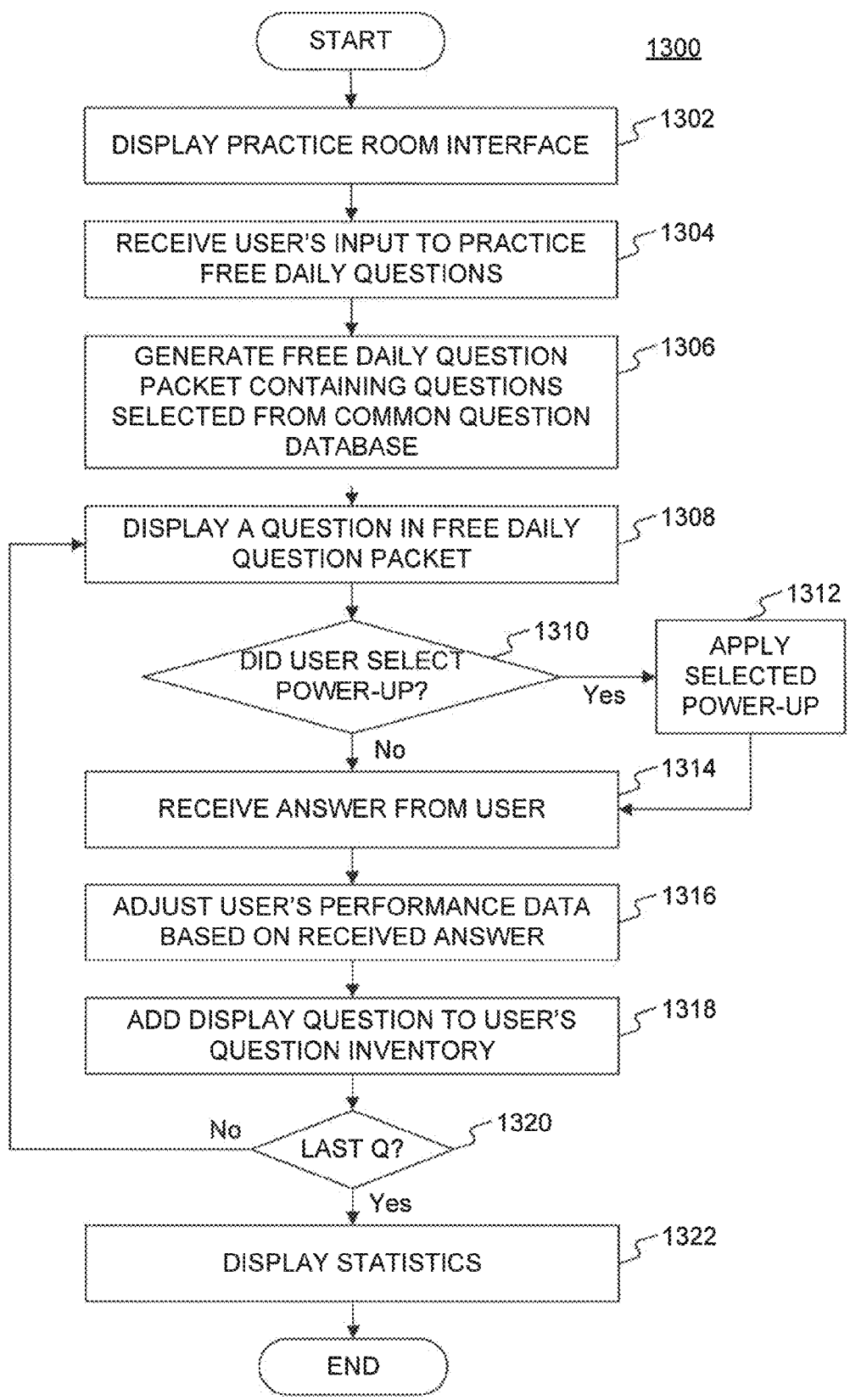
FIG. 13 is a flow chart of an exemplary practice process consistent with embodiments of the present disclosure.

FIG. 13 is a flow chart of an exemplary practice process 1300 consistent with embodiments of the present disclosure. Practice process 1300 may, for example, be performed by processor 110 interacting with the user via user terminal 160.

As illustrated in FIG. 13, after the user of user terminal 160 logs into the interactive educational application and selects the practice mode, processor 110 may instruct user terminal 160 to present practice room interface 300 (step 1302). Then, processor 110 may receive user input to practice with free daily questions via practice room interface 300 (step 1304). In response to the user's input, processor 110 may generate a free daily question packet that contains questions selected from common question database 121 (step 1306). Then processor 110 may instruct user terminal 160 to display practice interface 400 that displays one of the questions contained in the free daily question packet (step 1308). Next, processor 110 may determine whether the user selects one or more power-ups via practice interface 400 (step 1310). When the user selects one or more power-ups (step 1310, "Yes"), for example, processor 110 may apply the one or more selected power-ups (step 1312). For example, if the user selects hint power-up 462 as illustrated in FIG. 4, processor 110 may instruct user terminal 160 to update practice interface 400 to display a hint of the selected question. Then, when the user inputs an answer to the selected question, processor 110 may receive the answer via practice interface 400 (step 1314). When the user does not select one or more power-ups (step 1310, "No"), process 1300 may proceed directly to step 1314 where the user's answer is received by processor 110.

In some embodiments, processor 110 may then adjust the user's performance data based on an evaluation of the answer received from the user (step 1316). Processor 110 may also add the question into the user's question inventory (step 1318). Next, processor 110 may determine whether the previously answered question is the last question in the free daily question packet (step 1320). If not (step 1320, "No"), process 1300 may return to step 1308, in which processor 110 instructs user terminal 160 to display another question contained in the free daily question packet. If the previously answered question is the last question (step 1320, "Yes"), processor 110 may display statistics regarding the user's performance (step 1322).

Figure 14A:
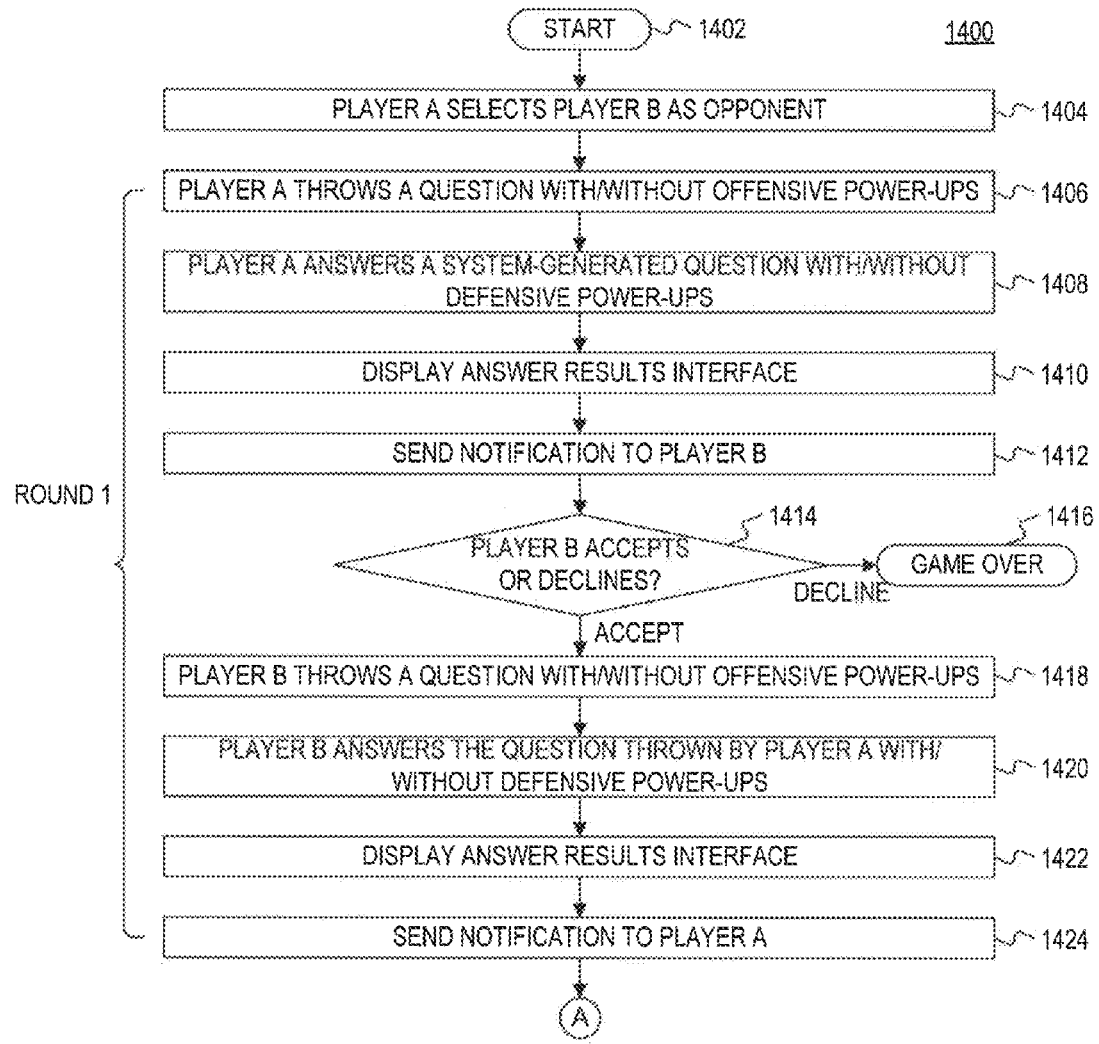
FIGS. 14A and 14B are a flow chart of an exemplary play process consistent with embodiments of the present disclosure.
Figure 14B:
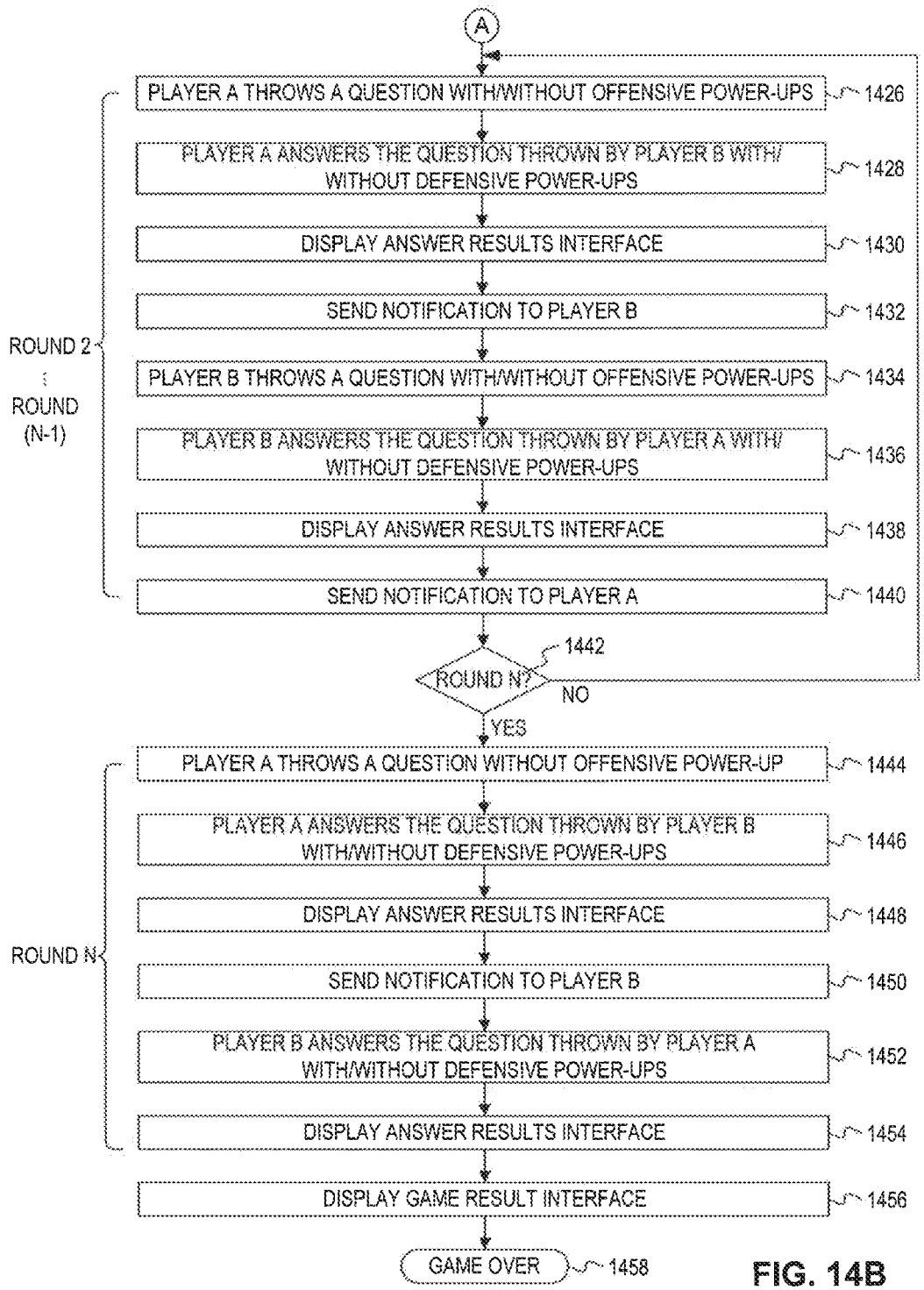

FIGS. 14A and 14B illustrate a flow chart of an exemplary play process 1400 consistent with embodiments of the present disclosure. Play process 1400 may, for example, be performed by processor 110 interacting with a user (i.e., Player A) via user terminal 160 and his opponent (i.e., Player B) via user terminal 161.

As illustrated in FIG. 14A, after play process 1400 starts at step 1402, Player A may select Player B as an opponent to start a game (step 1404). In the first round of the game (Round 1), processor 110 may present throw question interface 800 as illustrated in FIG. 8 so that Player A may throw a question at Player B (step 1406). Player A may choose to throw the question with or without offensive power-ups 851-853. Player A may be required to throw the question within a time period set by throw question timer 860. After Player A throws the question, processor 110 may present answer question interface 900 to Player A so that Player A may answer a system-generated question (step 1408). In Round 1, the system-generated question may be selected by processor 110 from common question database 121. Player A may answer the question with or without defensive power-ups 951-955. After Player A answers the question, processor 110 may display an answer result interface to Player A to show whether Player A's answer is correct or incorrect (step 1410). If the answer is incorrect, processor 110 may also provide a correct answer and the associated explanation in the answer result interface. Afterwards, processor 110 may send a notification to Player B informing it that it is Player B's turn to play the game (step 1412). The notification may be a pop-up window presented on user terminal 161 of Player B. The notification may be other types of push notifications, e.g., email, or push notifications to mobile devices, computers, or other network connected devices, etc.

In response to the notification, Player B may choose to accept or decline the game (step 1414). When Player B declines the game, the game may be over and process 1400 may end (step 1416). When Player B accepts the game, processor 110 may update game tab tile 220 presented on user terminal 161 of Player B to add the game into the list of pending games in your turn menu 223, so that Player B may access the game whenever he clicks the game in the list. Processor 110 may also update game tab tile 220 presented on user terminal 160 of Player A to add the game into the list of pending games in their turn menu 224.

When Player B accesses the game, processor 110 may present throw question interface 800 to Player B so that Player B may throw a question at Player A (step 1418). Similar to step 1406, Player B may choose to throw the question with or without offensive power-ups 851-853, and may be required to throw the question within a time period set by throw question timer 860. Then, processor 110 may present answer question interface 900 to Player B so that Player B may answer the question that is previously thrown by Player A (step 1420). Similar to step 1408, Player B may answer the question with or without defensive power-ups 951-955. Next, processor 110 may display an answer result interface to Player B to show whether Player B's answer is correct or incorrect, and if incorrect, may display a correct answer and the associated explanation (step 1422). Afterwards, processor 110 may send a notification to Player A informing that it is Player A's turn to play the game (step 1424). At this point, Round 1 of the game is completed.

Referring to FIG. 14B, steps 1426-1440 of Round 2 may be similar to steps 1406-1412 and 1418-1424 of Round 1, except that, at step 1428 of Round 2, Player A may answer the question that is previously thrown by Player B, instead of answering a system-generated question. In addition, step 1414 of Round 1 may be omitted in Round 2, such that Player B does not have to choose whether to accept or decline the game.

After Round 2 completes at step 1440 when processor 110 sends a notification to Player A informing it that it is Player A's turn to player the game, processor 110 may determine if the next round is Round N, which is the final round of the game (step 1442). If the next round is not Round N (step 1442, "No"), process 1400 may return to step 1426 where Player A throws a question at Player B. If the next round is Round N (step 1442, "Yes"), process 1400 may proceed to steps 1444-1454 which may be similar to steps 1426-1432 and 1436-1440 of Round 2, except that, at step 1444, Player A may not be enabled to throw a question with offensive power-ups. In addition, at Round N, Player B may not be enabled to throw a question at all.

After Round N is completed, processor 110 may display a game result interface 970 showing which one of Player A and Player B wins the game, and their respective scores, credits, and experience points achieved from playing the game (step 1456). Then, the game may be over at step 1458.

Although in the embodiment illustrated in FIGS. 14A and 14B, in each round, each player throws a question and then answers a question previously thrown by the opponent, the present disclosure is not so limited. In an alternative embodiment, the game starts with Player A throwing a question to Player B. Next, in each one of Round 1 through Round (N−1), Player B answers the question thrown by Player A and then throws a new question to Player A, and Player A answers the new question thrown by Player B and throw a new question to Player B. Finally, in Round N, Player B answers the question thrown by Player A and then throws a new question to Player A, and Player A answers the new question thrown by Player B without throwing any question to Player B.

In some embodiments, processor 110 may generate, and instruct user terminal 160 to display notifications regarding key events, such as invitations, challenges, new levels achieved, etc., through social network media. Such notifications may appear as part of a user's profile, as news items accessible to other users, as messages sent to certain users, etc.

In some embodiments, processor 110 may instruct user terminal 160 to display an interface that allows the user to select a question from the user's question inventory and send the question as a gift to another user. The interface may also allow the user to send instructional content, question hints, power-ups, credits, and other game/learning components as gifts to another user.

In some embodiments, processor 110 may provide an organized game environment for a specific test mode at a scheduled time, so that a plurality of users may play games of the specific test mode at the same time. For example, processor 110 may schedule Wednesday night as "SAT night", so that users from across the country (or any other region) can gather to play SAT-specific games on Wednesday night. Various other timing schemes are possible as well.

In some embodiments, processor 110 may dynamically adjust the type and difficulty of the questions to be provided to the user based on the user's performance. For example, if the user's accuracy rate is less than 60% after having practiced for 10 questions, processor 110 may select a next question that is less difficult than the previous questions provided to the user. Similarly, if questions are found too easy for the user, the difficultly level may be increased. In another example, if the user's accuracy rate related to a specific skill is almost 100%, processor 110 may provide fewer questions directed to the specific skill to the user.

In some embodiments, the profile information of each user and the information that is displayed on the leader boards may be published or otherwise made available to third parties. For example, in an embodiment where the interactive education application is preparing students for the ACT or SAT, the statistics of each user may be made available to different educational institutions. In some embodiments, such information may be provided for a fee. The institution may customize the statistics that it receives. For example, an institution may choose to receive information about users who have achieved a percentage of correct answers above a certain threshold and/or who have expressed interest in that institution in their profile information.

For example, the institution may pay a test preparation company utilizing the interactive educational application a fee to access server 100 via network 150 in order to receive users' profile information. Alternatively, the test preparation company utilizing the interactive educational application may send the profile information directly to the institution, e.g., via e-mail. The profile information that the institution receives may include user contact information such as an e-mail address or an SNP username, such as a Facebook® username, for example. In this way, the institution can pay the test preparation company to get in contact with the user and express its interest in the user being a future student.

Other embodiments of the disclosure will be apparent to those skilled in the art from consideration of the specification and practice of the disclosure presented herein. It is intended that the specification and examples be considered as exemplary only, with a true scope and spirit of the invention being indicated by the following claims.

What is claimed is:

1. An interactive education system comprising:
   a first memory storing a common question database and a plurality of user-specific question inventories;
   a second memory storing computer instructions; and
   a processor configured to execute the computer instructions to perform operations comprising:
      presenting a game environment between a first user and a second user where the first and second users can throw questions from their respective question inventories or common question database at each other with offensive power-ups, and answer the questions thrown by each other with defensive power-ups;
      rewarding the first and second users with credits and points when the first and second users answer the questions correctly;
      determining which one of the first and second users wins the game based on the respective total number of points achieved by the first and second users;
      enabling the first and second users to purchase additional offensive or defensive power-ups with their respective credits; and
      enabling the first user to review performance of a plurality of users of the interactive education system,
   wherein the performance of each one of the plurality of users includes at least one of:
      a total number of experience points achieved based on the number of questions that the user has answered;
      a total number of credits achieved by the user;
      a total number of games won by the user;
      a total number of games played by the user; or
      an accuracy rate achieved by the user.

2. The interactive education system of claim 1, wherein the processor is further configured to execute the computer instructions to perform operations comprising:
   presenting a practice environment to the first user where the first user can answer questions selected from the first user's question inventory or from the common question database with defensive power-ups; and
   rewarding the first user with credits when the first user answers the questions correctly.

3. The interactive education system of claim 2, wherein the processor is further configured to execute the computer instructions to perform operations comprising:
   periodically providing the first user with one or more questions selected from the common question database to answer.

4. The interactive education system of claim 2, wherein the processor is further configured to execute the computer instructions to perform operations comprising:
   enabling the first user to purchase a variety question pack including a predetermined number of questions selected from the common question database by using credits.

5. The interactive education system of claim 2, wherein the processor is further configured to execute the computer instructions to perform operations comprising:
   presenting an analysis of the first user's performance with respect to a question section and a skill within the question section; and
   enabling the first user to access the questions in the first user's question inventory and belong to the question section.

6. The interactive education system of claim 5, wherein the processor is further configured to execute the computer instructions to perform operations comprising:

enabling the first user to purchase access to the questions in the first user's question inventory directed to the skill and purchase additional questions in the common question database directed to the skill by using credits.

7. The interactive education system of claim 1, wherein the processor is further configured to execute the computer instructions to perform operations comprising:
determining a level of each user based on the user's performance.

8. The interactive education system of claim 1, wherein the processor is further configured to execute the computer instructions to perform operations comprising:
enabling the first user to purchase credits by using real-world or virtual currency.

9. The interactive education system of claim 1, wherein the system is accessible by a plurality of users through a social-networking platform.

10. The interactive education system of claim 1,
wherein the offensive power-ups include at least one of a double points power-up, a decrease time power-up, and a swap question power-up, and
the defensive power-ups include at least one of a double points power-up, a swap question power-up, a hint power-up, an add time power-up, and a fewer choices power-up.

11. The interactive education system of claim 1, wherein the processor is further configured to execute the computer instructions to perform operations comprising:
grouping the plurality of users of the interactive education system by a school with which they are associated; and
enabling the first user to review the performance of a plurality of users associated with the same school as the first user.

12. The interactive education system of claim 1, wherein the processor is further configured to execute the computer instructions to perform operations comprising:
grouping the plurality of users of the interactive education system by a school they are interested in attending; and
enabling the first user to review the performance of a plurality of users interested in attending the same school as the first user.

13. A computer-implemented method for providing an interactive educational application to a plurality of users, comprising:
presenting, using machine, a game environment between a first user and a second user where the first and second users can throw questions from their respective question inventory at each other, and answer the questions thrown by each other;
respectively rewarding the first and second users with credits and points when the first and second users answer the questions correctly;
determining, using the machine, which one of the first and second users wins the game based on the respective total number of points achieved by the first and second users;
enabling, using the machine, the first and second users to purchase offensive or defensive power-ups by using their respective credits; and
enabling the first user to review performance of the plurality of users of the interactive educational application,
wherein the performance of each user includes at least one of:
a total number of experience points achieved based on the number of questions that the user has answered;
a total number of credits achieved by the user;
a total number of games won by the user;
a total number of games played by the user; or
an accuracy rate achieved by the user.

14. The method of claim 13, further comprising:
presenting, by the machine, a practice environment to the first user where the first user can answer questions selected from the first user's question inventory or from a common question database with defensive power-ups; and
rewarding the first user with credits when the first user answers the questions correctly.

15. The method of claim 14, further comprising:
periodically providing the first user with one or more questions selected from the common question database to answer.

16. The method of claim 14, further comprising:
enabling the first user to purchase a variety question pack including a predetermined number of questions selected from the common question database by using credits.

17. The method of claim 14, further comprising:
presenting, to the first user, an analysis of the first user's performance with respect to a question section and a skill within the question section; and
enabling the first user to access the questions in the first user's question inventory that belong to the question section.

18. The method of claim 17, further comprising:
enabling the first user to purchase access to the questions in the first user's question inventory directed to the skill and purchase additional questions in the common question database directed to the skill by using credits.

19. The method of claim 13, further comprising:
enabling the first user to purchase additional credits by using real-world or virtual currency.

20. A non-transitory computer-readable medium comprising computer-readable code to cause a machine to execute a method, the method comprising:
presenting, by the machine, a game environment between a first user and a second user where the first and second users can throw questions from their respective question inventory or common question database at each other, and answer the questions thrown by each other;
respectively rewarding, by the machine, the first and second users with credits and points when the first and second users answer the questions correctly;
determining, by the machine, which one of the first and second users wins the game based on the respective total number of points achieved by the first and second users;
enabling the first and second users to purchase offensive or defensive power-ups by using their respective credits; and
enabling the first user to review performance of the plurality of users of the interactive educational application,
wherein the performance of each user includes at least one of:
a total number of experience points achieved based on the number of questions that the user has answered;
a total number of credits achieved by the user;
a total number of games won by the user;
a total number of games played by the user; or
an accuracy rate achieved by the user.

* * * * *